United States Patent
Matsumoto

(10) Patent No.: US 8,042,421 B2
(45) Date of Patent: Oct. 25, 2011

(54) MULTI-GEAR-SPEED TRANSMISSION

(75) Inventor: Shinya Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 436 days.

(21) Appl. No.: 12/395,045

(22) Filed: Feb. 27, 2009

(65) Prior Publication Data

US 2009/0241717 A1 Oct. 1, 2009

(30) Foreign Application Priority Data

Mar. 31, 2008 (JP) .................................. 2008-093700

(51) Int. Cl.
*F16H 59/00* (2006.01)
(52) U.S. Cl. .......................... 74/337.5; 74/358; 192/48.7
(58) Field of Classification Search ..................... 74/355, 74/356, 358, 362, 365, 379, 337.5; 192/48.7, 192/93 C, 71
See application file for complete search history.

(56) References Cited

U.S. PATENT DOCUMENTS

| 1,102,427 | A  | * | 7/1914 | Morgan | 74/372 |
| 6,698,303 | B2 | * | 3/2004 | Hoffmann et al. | 74/337.5 |
| 7,770,480 | B2 | * | 8/2010 | Martin | 74/333 |
| 7,882,758 | B2 | * | 2/2011 | Kubo et al. | 74/372 |

FOREIGN PATENT DOCUMENTS

JP 3838494 B2 10/2006

* cited by examiner

*Primary Examiner* — Justin Holmes
(74) *Attorney, Agent, or Firm* — Birch, Stewart, Kolasch & Birch, LLP

(57) ABSTRACT

A multi-gear-speed transmission includes cam rods in sliding contact with an inner peripheral surface of an inner cavity of a gear shaft; pin members inserted in pin holes bored in the gear shaft in the radial directions and which are advanced or retreated by alternatedly making contact with the sliding contact surfaces of the cam rods and cam grooves. Swing claw members are rotatably supported on pivot pins provided in the gear shaft and which are advanced or retracted by the pin members to be engaged with or disengaged from gears (n). The swing claw members and the pivot pins are embedded in recessed parts formed in the outer periphery of the gear shaft, annular bearing collar members externally fitted over the gear shaft are arranged to press the pivot pins from the outer side, and the gears (n) are rotatably borne on the bearing collar members.

20 Claims, 13 Drawing Sheets

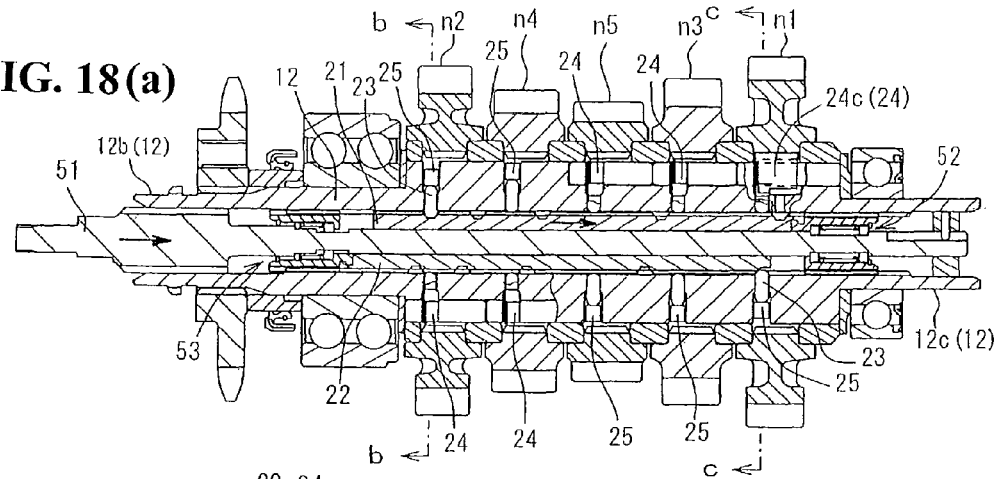
FIG. 18(a)
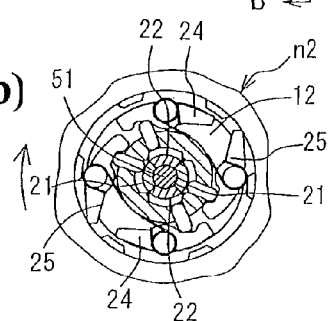
FIG. 18(b)
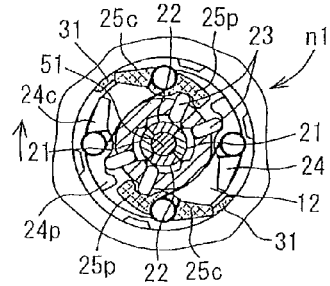
FIG. 18(c)
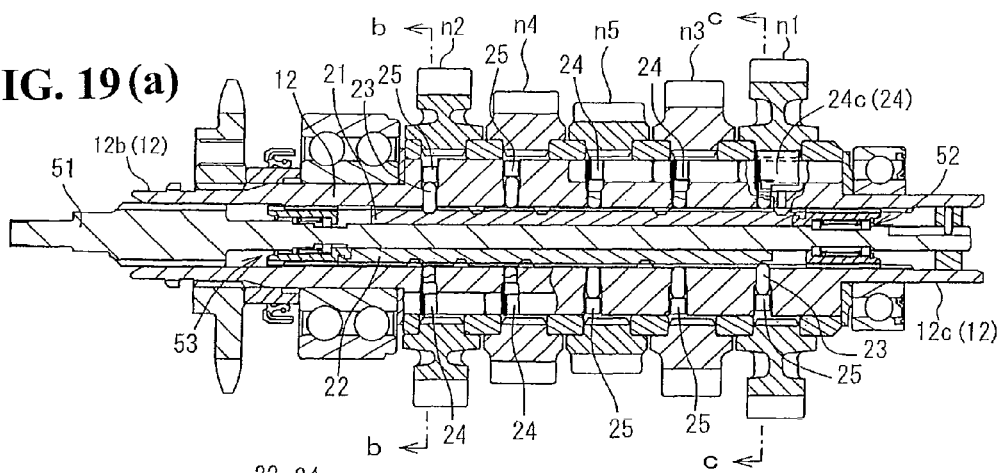
FIG. 19(a)
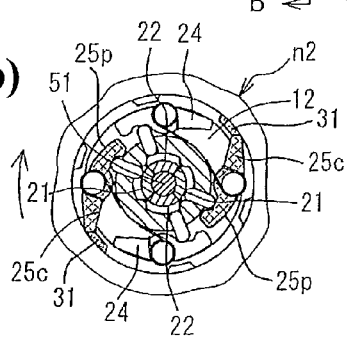
FIG. 19(b)
FIG. 19(c)

FIG. 20(a)
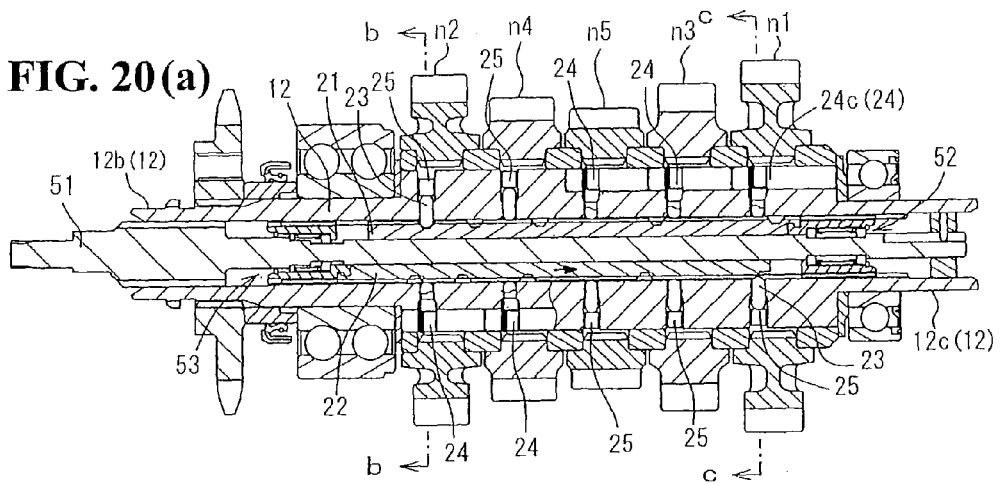
FIG. 20(b)
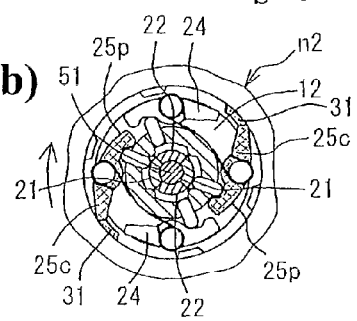
FIG. 20(c)
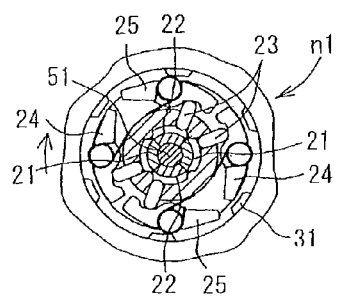
FIG. 21(a)
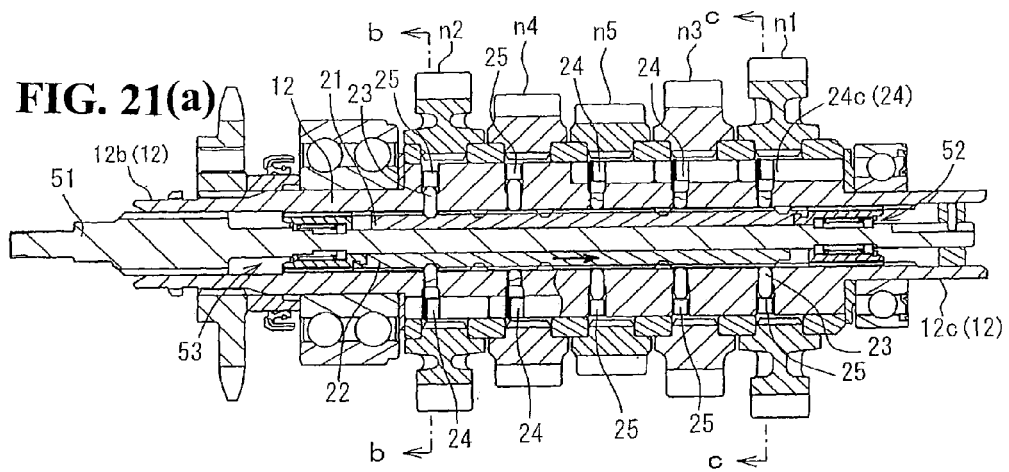
FIG. 21(b)
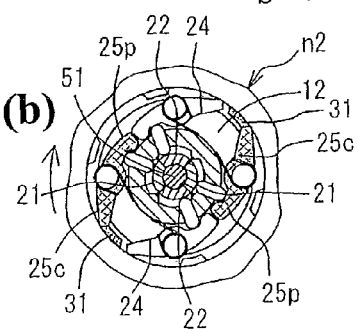
FIG. 21(c)

FIG. 24(a)
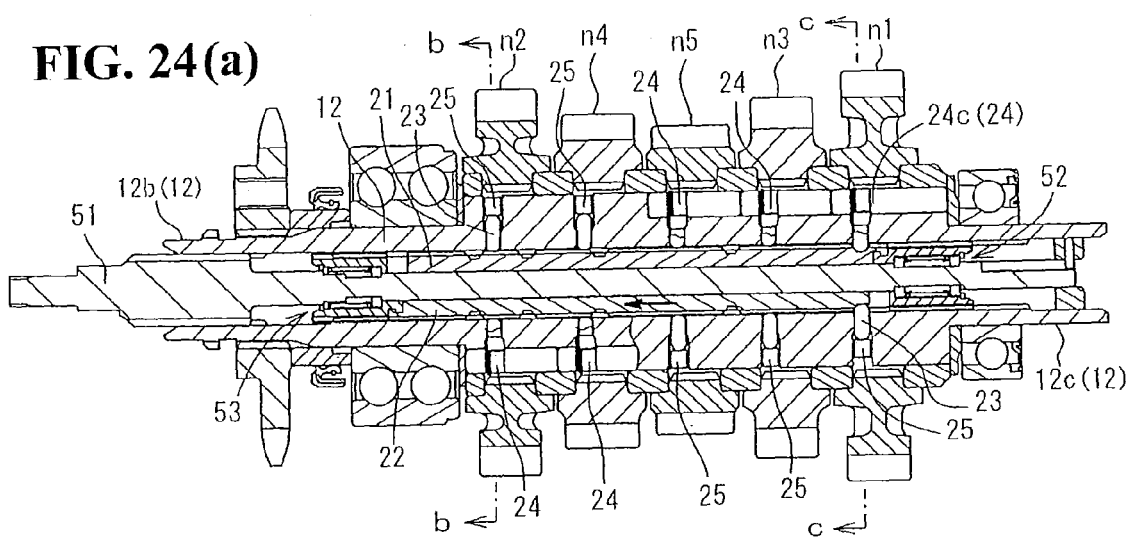
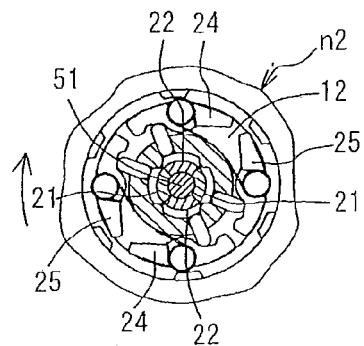
FIG. 24(b)
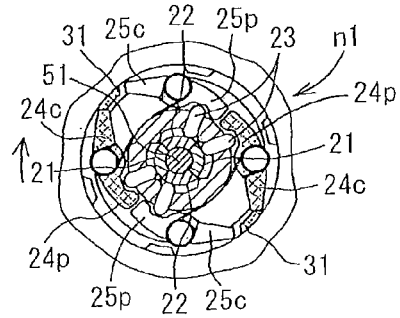
FIG. 24 (c)

MULTI-GEAR-SPEED TRANSMISSION

CROSS-REFERENCE TO RELATED APPLICATION

The present application claims priority under 35 U.S.C. §119 to Japanese Patent Application No. 2008-093700, filed Mar. 31, 2008, the entire contents of which are hereby incorporated by reference.

BACKGROUND OF THE INVENTION

1. Field of the Invention

The present invention relates to a multi-gear-speed transmission in which a plurality of drive gears and a plurality of driven gears are supported respectively on parallel gear shafts in the state of being normally meshed on a gear speed basis.

2. Description of Background Art

The normally meshed type multi-gear-speed transmission has a configuration in which the gears on one hand of the drive gears and the driven gears are fixed on a gear shaft, whereas the gears on the other hand of the drive gears and the driven gears are rotatably borne on another gear shaft, and that one of the rotatably borne gears which is engaged with the rotary shaft is changed over by engaging means, to thereby make a gear shift.

There is a patent application which has been filed by the present applicant and granted a patent, in which cam member-driven engaging pawls are used for the engagement between the gear and the gear shaft in such a configuration as above.

The transmission disclosed in Japanese Patent No. 3838494 has a structure in which a cam member (clutch operating element) provided with a cam groove is moved in the axial direction inside a hollow gear shaft (transmission shaft) rotatably bearing gears thereon, whereby pin members supported in the state of penetrating a side wall of the hollow gear shaft are moved up or down to cause free ends of ratchet pawls fitted in an inner peripheral part of the gear to project or retract from the inner peripheral surface. When the free ends of the ratchet pawls are projected, they are engaged with gear teeth formed in the hollow gear shaft so as to transmit rotation in one direction, and when the ratchet pawls are retracted, the engagement is released.

Each of the gears is provided in its inner peripheral part with recessed parts for accommodating the ratchet pawls, and the ratchet pawls are swingably fitted in the recessed parts so that their free ends can project or retract from the inner peripheral surface.

For each of the gears, two such ratchet pawls are provided.

Therefore, the structure is complicated. In addition, at the time of mounting the plurality of gears to the gear shaft, the gears must be fitted over the gear shaft while keeping the ratchet pawls contained in the two recessed parts of the inner peripheral part of each of the gears so that their free ends will not project from the inner peripheral surface of the gear. In this case, the pin members must be preliminarily inserted in radially penetrating through-holes provided in the gear shaft in plurality in the circumferential direction, in such a state as not to interfere with the gears.

The operation of fitting the gears over the gear shaft in the condition where the ratchet pawls are thus respectively contained in the two recessed parts of the inner peripheral part of each of the gears may need use of some jig(s) and is not easy to carry out. In addition, on the side of the gear shaft, the condition where the plurality of pin members are inserted in plurality in the circumferential direction has to be maintained during the operation. This further increases the difficulty in carrying out the operation.

SUMMARY AND OBJECTS OF THE INVENTION

The present invention has been made in consideration of the above-mentioned points. Accordingly, it is an object of the present invention to provide a multi-gear-speed transmission which is simple in structure and which promises an easy mounting (assembling) work and a short working time.

In order to attain the above object, according to an embodiment of the present invention, a multi-gear-speed transmission includes a plurality of drive gears and a plurality of driven gears supported respectively on parallel gear shafts in the state of being normally meshed on a gear speed basis, the plurality of gears on one hand of the drive gears and the driven gears being fixed to the gear shaft, an engaging means being provided between the plurality of gears on the other hand of the drive gears and the driven gears and the gear shaft so as to make engagement therebetween. The engaging means is changed over by a gear shift driving means so as to make a gear shift.

The engaging means includes: an engaging projected part projectingly formed at an inner peripheral surface of each of the gears at a required location in the circumferential direction in the state of having engaging surfaces in the circumferential direction; a cam rod which is put in sliding contact with an inner peripheral surface of an inner cavity of the gear shaft so as to be movable in the axial direction and which is provided in its sliding contact surface with a plurality of cam grooves at required locations in the axial direction; and pin members which are inserted in pin holes bored in required portions of the gear shaft in the radial direction and which are each advanced or retreated while alternately making contact with the sliding contact surface of the cam rod moved in the axial direction and with the cam groove. The engaging means also includes engaging claw members which are rotatably borne on pivot pins provided in the gear shaft and which are swung by the advancing/retreating of the pin members so as to be engaged with or disengaged from the engaging projected parts, wherein the swing claw members and the pivot pins are embedded in recessed parts formed in the outer periphery of the gear shaft, annular bearing collar members externally fitted over the gear shaft are so arranged as to press the pivot pins from the outer side, and the gears are rotatably borne on the bearing collar members.

According to an embodiment of the present invention, the pivot pins corresponding respectively to the gears are embedded in the recessed parts in the gear shaft in the state of being arrayed in rows along the axial direction, and the bearing collars are arranged so as to bridgingly cover the adjacent pivot pins.

According to an embodiment of the present invention, the gears are provided at both their inner peripheral edge parts with notches for slidable engagement with the bearing collar members.

According to an embodiment of the present invention, the swing claw members are each provided with a bearing recessed part by eliminating an outside part of a through-hole in which to pass the pivot pin.

Effects of the invention include the following:

According to an embodiment of the present invention, the pin members are inserted in the pin holes in the gear shaft, the swing claw members and the pivot pins are embedded in the recessed parts formed in the outer periphery of the gear shaft, the bearing collar members externally fitted over the gear shaft press the pivot pins from the outer side, and the gears are rotatably borne on the bearing collar members. Therefore, the condition where the pin members have been inserted in the pin holes and the swing claw members and the pivot pins have been embedded in the recessed parts in the gear shaft can be maintained by external fitting of the bearing collar members thereover, and, in this condition, the gears can be mounted on the bearing collar members. Accordingly, a simple structure is realized, and an easy mounting (assembling) work and a short working time are promised.

According to an embodiment of the present invention, the pivot pins corresponding respectively to the gears are embedded in the recessed parts of the gear shaft in the state of being arrayed in rows along the axial direction. Therefore, the recessed parts of the gear shaft are simplified in shape, and machining thereof is facilitated.

In addition, since the bearing collar members are each so arranged as to bridgingly cover the adjacent ones of the pivot pins arrayed in rows, it is possible to suppress the number of the bearing collar members to be used, to thereby reduce the component parts, and to simplify the structure.

According to an embodiment of the present invention, the gears are provided at both their inner peripheral edge parts with notches for slidable engagement with the bearing collar members. Therefore, the bearing collar members can bear the axial forces pertaining to the gears, and therefore can ensure positioning of the gears in the axial direction and receive the thrust forces therefrom.

According to an embodiment of the present invention, the swing claw members are each provided with the bearing recessed part by eliminating an outside part of the through-hole in which to pass the pivot pin. Therefore, the pivot pins can be externally mounted into the bearing recessed parts of the swing claw members to rotatably bear the swing claw members. Accordingly, mounting of the swing claw members to the gear shaft can be facilitated, and the structure can be simplified.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 18($a$)-($c$) illustrate the next step;

FIGS. 19($a$)-($c$) illustrate the subsequent step;

FIGS. 20($a$)-($c$) illustrates the subsequent step;

FIGS. 21($a$)-($c$) illustrates the 2nd gear speed condition upon completion of the upshift work;

FIGS. 24($a$)-($c$) illustrates the 1st gear speed condition upon completion of the downshift.

DETAILED DESCRIPTION OF THE PREFERRED EMBODIMENTS

A multi-gear-speed transmission 10 according to the present embodiment is configured in combination with an internal combustion engine mounted on a motorcycle.

Figure 1:
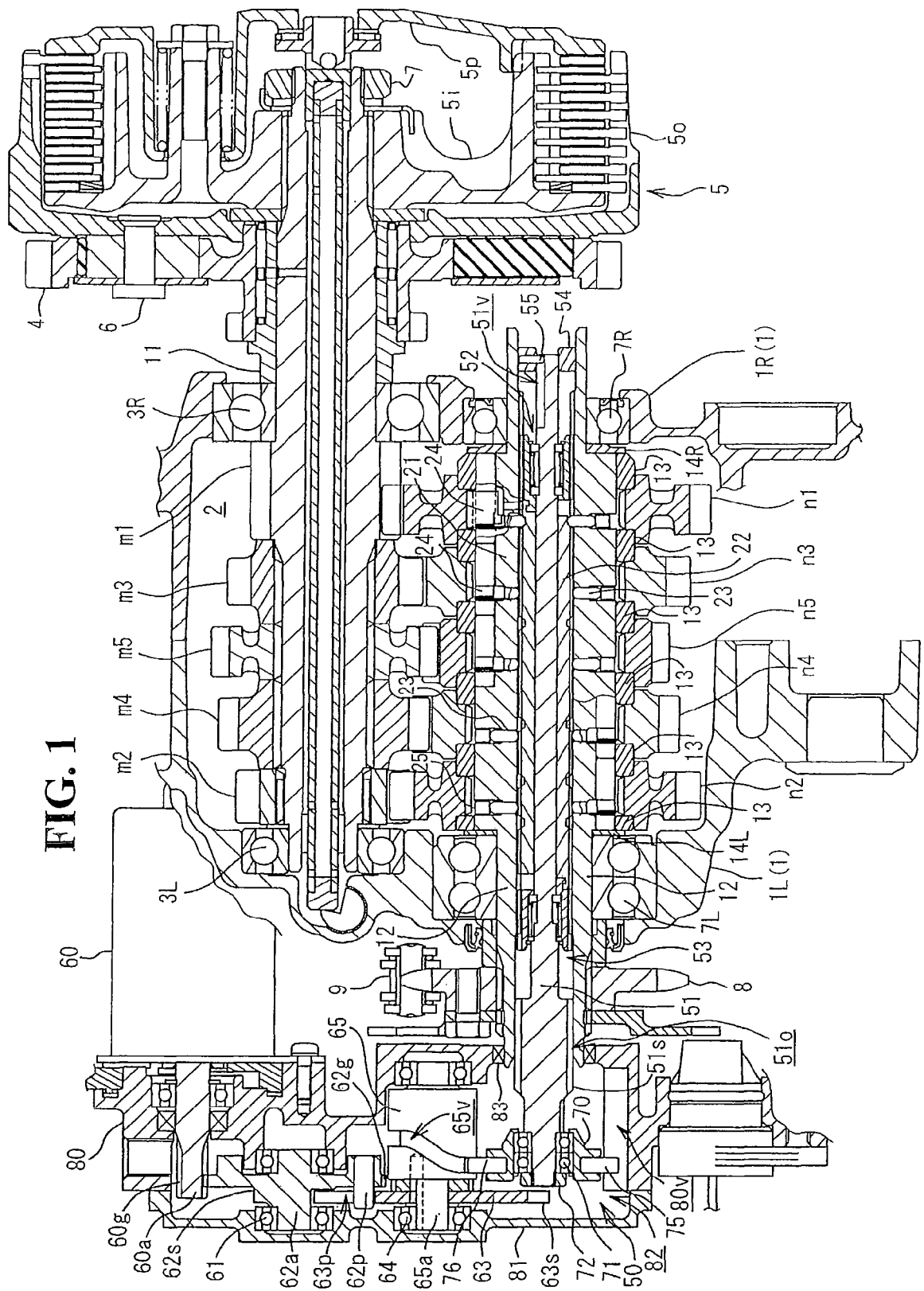
FIG. 1 is a sectional view of a multi-gear-speed transmission according to one embodiment of the present invention.

FIG. 1 is a sectional view of the multi-gear-speed transmission 10. As shown in FIG. 1, the multi-gear-speed transmission 10 is provided in an engine case 1 which is common to the internal combustion engine.

The engine case 1 configured by coupling a left engine case 1L and a right engine case 1R of a left-right split type defines a transmission chamber 2, in which a main gear shaft 11 and a counter gear shaft 12 are rotatably supported in parallel to each other and in left-right orientation.

The main gear shaft 11 is rotatably borne on side walls of the left engine case 1L and the right engine case 1R through bearings 3L and 3R, and a multiple-disk friction clutch 5 is provided at a right end part, protruding from the transmission chamber 2 by penetrating the right bearing 3R, of the main gear shaft 11.

On the left side of the friction clutch 5, a primary driven gear 4 to which rotation of a crankshaft (not shown) is transmitted is rotatably borne on the main gear shaft 11.

The friction clutch 5 has a structure in which a clutch inner 5*i* is spline fitted over a right end part of the main gear shaft 11 and fixed to the right end part by a nut 7, and a large-diameter, bowl-shaped clutch outer 5*o* accommodating the clutch inner 5*i* and a pressure plate 5*p* combined with the clutch inner 5*i* is connected to the primary driven gear 4 by connecting means 6.

Therefore, the rotation of the crankshaft of the internal combustion engine is transmitted from the primary driven gear 4 to the main gear shaft 11 through the friction clutch 5 in an engaged (connected) state.

On the other hand, the counter gear shaft 12 is also rotatably borne on the side walls of the left engine case 1L and the right engine case 1R through bearings 7L and 7R, and an output sprocket 8 is fixed by spline fit to a left end part, protruding from the transmission chamber 2 by penetrating the left bearing 7L, of the counter gear shaft 12.

A drive chain 9 wrapped around the output sprocket 8 is wrapped around a sprocket for driving a rear wheel (not shown) on the rear side, whereby the rotational power of the counter gear shaft 12 is transmitted to the rear wheel, and the vehicle is made to run.

Between the left and right bearings 3L and 3R, a group of drive transmission gears (m) are provided on the main drive shaft 11 so that they can each be rotated as one body with the main gear shaft 11.

A 1st drive transmission gear m1 is formed as one body with the main gear shaft 11 along the right bearing 3R, and 3rd, 5th, 4th, and 2nd drive transmission gears m3, m5, m4, and m2 in this order from the right to the left side are fixed by spline fit to the main gear shaft 11 through splines formed between the 1st drive transmission gear m1 and the left bearing 3L.

On the other hand, a group of driven transmission gears (n) are borne on the counter gear shaft 12 between the left and right bearings 7L and 7R through annular bearing collar members 13 therebetween so that they can be rotated relative to the main gear shaft 11.

On the counter gear shaft 12, the bearing collar member 13 at the right end is externally mounted through a collar member 14R interposed on at the left of the right bearing 7R, and the bearing collar member 13 at the left end is externally mounted through a collar member 14L interposed at the right of the left bearing 7L. In addition, four bearing collar members 13 are externally mounted on the counter gear shaft 12 at regular intervals between the right-end bearing collar member 13 and the left-end bearing collar member 13, and 1st, 3rd, 5th, 4th, and 2nd driven transmission gears n1, n3, n5, n4, and n2 in this order from the right to the left side are rotatably borne on the counter gear shaft 12 in the maimer of being each bridgingly disposed between each par of adjacent ones of the total of six bearing collar members 13.

The 1st, 3rd, 5th, 4th, and 2nd drive transmission gears m1, m3, m5, m4, and m2 each rotated as one body with the main gear shaft 11 are normally meshed respectively with the corresponding 1st, 3rd, 5th, 4th, and 2nd driven transmission gears n1, n3, n5, n4, and n2 which are rotatably borne on the counter gear shaft 12.

The meshing of the 1st drive transmission gear m1 with the 1st driven transmission gear n1 constitutes the 1st gear speed corresponding to a highest reduction gear ratio, whereas the meshing of the 5th drive transmission gear m5 with the 5th driven transmission gear n5 constitutes the 5th gear speed corresponding to a lowest reduction gear ratio, and the reduction gear ratio is sequentially decreased therebetween to constitute the 2nd, 3rd, and 4th gear speeds.

The counter gear shaft 12, which is tubular in shape, is provided, incorporated therein as described later, with engaging means 20 capable of engaging with each of the driven transmission gears (n). A total of four first and second cam rods 21, 21, 22, 22 as components of the engaging means 20 are axially movably slidably fitted in the inner peripheral surface of the counter gear shaft 12.

The four first and second cam rods 21, 21, 22, 22 are substantially in such shapes that a hollow cylinder is evenly divided into four sections arrayed in the circumferential direction; the cam rods are classified into two kinds, i.e., the first cam rods 21 and the second cam rods 22, and each pair of the cam rods of the same kind are located at symmetrical positions.

Figure 10:
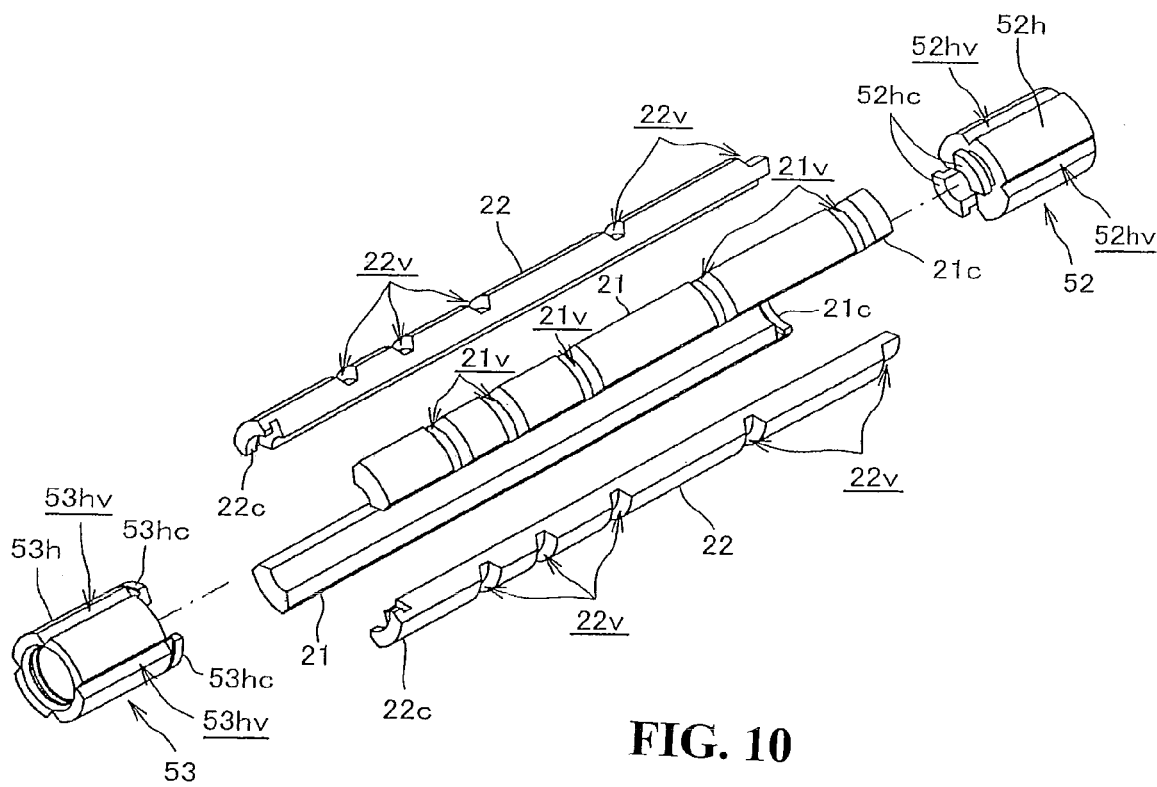
FIG. 10 is an exploded perspective view of cam rods and lost motion mechanisms.

The first and second cam rods 21, 22 are cam members of which the sliding contact surfaces in sliding contact with the inner peripheral surface of the counter gear shaft 12 constitute cam surfaces, and are provided with circumferentially oriented arc-shaped cam grooves $21v$, $22v$ respectively at five required locations along the axial direction (see FIG. 10).

A control rod 51 as one component of gear shift driving means 50 for driving the first and second cam rods 21, 22 through a gear shift is inserted in the counter gear shaft 12 in the state of being located on the cavity center line of the counter gear shaft 12 and in sliding contact with the inside of the four first and second cam rods 21, 21, 22, 22. A movement of the control rod 51 in the axial direction moves the first and second cam rod 21, 21, 22, 22 in a conjunction manner through lost motion mechanisms 52, 53.

A mechanism for moving the control rod 51 in the axial direction is provided on the left side of the left engine case 1L.

A power transmission case 80 is provided on the left side of the left engine case 1L so as to cover the output sprocket 8, and the further left side of the power transmission case 80 is covered with a case cover 81, defining a gear shift driving chamber 82 between the power transmission case 80 and the case cover 81.

The left end of the counter gear shaft 12 is fitted in an opening in the power transmission case 80 through a seal member 83 so as to front on the gear shift driving chamber 82, and the control rod 51 in the counter gear shaft 12 projects further leftwards beyond the left end of the counter gear shaft 12, into the gear shift driving chamber 82.

On the upper side of the power transmission case 80, a gear shift driving motor 60 is firmly attached, with its drive shaft $60a$ protruding into the gear shift driving chamber 82 on the left side.

A Geneva driving motor (Geneva drive) 62 is bridgingly provided between the power transmission case 80 and the case cover 81 in such a manner that its integral rotary shaft $62a$ is rotatably borne through bearings 61, 61 and that its driven gear teeth $62g$ are meshed with drive gear teeth $60g$ formed on the drive shaft $60a$ of the gear shift driving motor 60.

Figure 2:
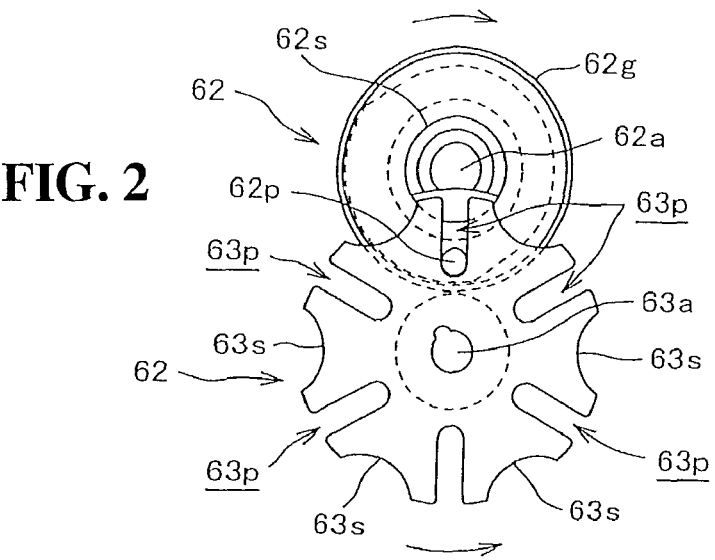
FIG. 2 illustrates a Geneva stop mechanism in gear shift driving means.
Figure 3:
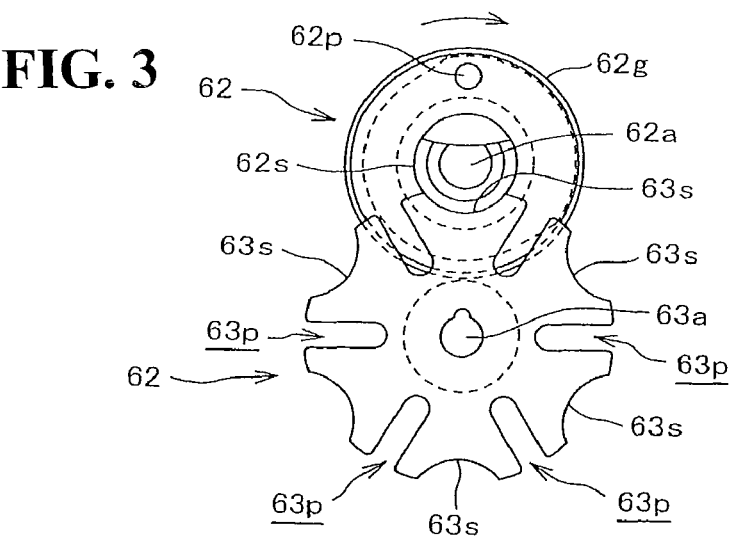
FIG. 3 illustrates the Geneva stop mechanism in another state.

The Geneva driving gear 62 is provided with an operating pin $62p$ projected leftwards at a position eccentrically deviated by a predetermined distance from its center of rotation, and a predetermined-radius arc-shaped projected surface $62s$ formed on the opposite side of the center of rotation from the operating pin $62p$ (see FIGS. 1, 2 and 3).

Besides, in the gear shift driving chamber 82, between the Geneva driving gear 62 and a left end part of the control rod 51, a shift drum 65 is bridgingly provided between the power transmission case 80 and the case cover 81, with its rotary shaft $65a$ rotatably borne through bearings 64, 64.

The shift drum 65 is provided with a guide groove $65v$ in an outer peripheral surface of a drum body thereof.

Figure 4:
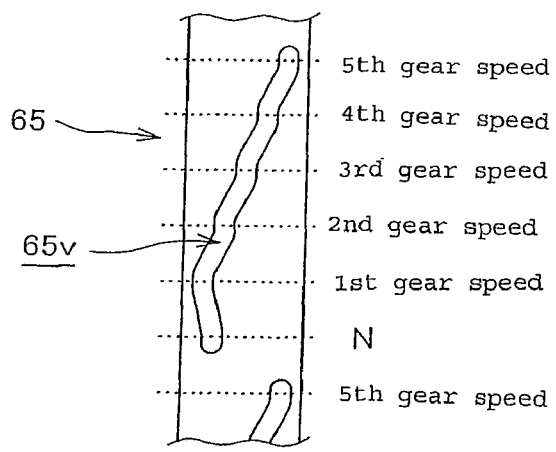
FIG. 4 is a development of an outer peripheral surface of a shift drum.

FIG. 4 is a development of the outer peripheral surface of the shift drum 65. The guide groove $65v$ is so formed that a neutral (N) position is provided at a somewhat left-side position, a 1st gear speed position rotated along the circumferential direction by 60 degrees from the neutral (N) position is provided at a position displaced further to the left side in the axial direction relative to the neutral (N) position, and 2nd, 3rd, 4th, and 5th gear speed positions rotated by 60 degrees each from the 1st gear speed position are successively provided at positions sequentially displaced to the right side in the axial direction from the 1st gear speed position.

A Geneva driven gear 63 is fitted on the rotatary shaft 65a of the shift drum 65, correspondingly to the Geneva driving gear 62.

The Geneva driven gear 63 is provided with six radially orientated grooves 63p at regular angular intervals of 60 degrees in the circumferential direction, and an arc-shaped recessed surface 63s is formed between each pair of adjacent radial grooves 63p, 63p (see FIGS. 2 and 3).

The Geneva driving gear 62 and the Geneva driven gear 63 constitute a ⅙-revolution Geneva stop mechanism.

Specifically, as shown in FIG. 2, from the moment when the operating pin 62p turned by the rotation of the Geneva driving gear 62 enters one radial groove 63p in the Geneva driven gear 63 until it comes out of the radial groove 63p, it rotates the Geneva driven gear 63 by ⅙ revolution. At the time when the operating pin 62p comes out of the radial groove 63p, the arc-shaped projected surface 62s of the Geneva driving gear 62 is engaged with the arc-shaped recessed surface 63s of the Geneva driven gear 63, whereby the Geneva driven gear 63 is lockedly fixed, as shown in FIG. 3.

Therefore, with one revolution of the Geneva driving gear 62, the Geneva driven gear 63 is securely rotated by ⅙ revolution as one body with the shift drum 65.

Referring to FIG. 1, inner laces of two ball bearings 71, 71 are firmly attached to a left end part of the control rod 51 by a nut 72, and a control rod operating element 70 is fitted over outer laces of the ball bearings 71, 71.

An engaging pin 75 projectingly provided on the control rod operating element 70 is in sliding engagement with a long groove 80v formed in the power transmission case 80 to be orientated in the left-right direction.

In addition, separately from this, a guide pin 76 is provided on the control rod operating element 70 in the state of projecting toward the shift drum 65, and is in sliding engagement with a guide groove 65v in the shift drum 65.

Therefore, the control rod operating element 70 rotatably holds the left end part of the control rod 51 while being restricted in its own rotation by the engagement of the engaging pin 75 with the long groove 80v.

When the shift drum 65 is intermittently rotated as above-mentioned, the control rod operating element 70 is moved along the left-right axial direction through the guide pin 76 engaged with the guide groove 65v in the shift drum 65; therefore, the movement of the control rod operating element 70 moves the control rod 51 by a required amount each at a time in the axial direction through the two ball bearings 71, 71.

The movement of the control rod 51 in the axial direction moves the cam rods 21, 22 in a conjunction manner through the lost motion mechanism 52, 53, and the movement of the cam rods 21, 22 causes the engaging means 20 incorporated in the counter gear shaft 12 to selectively engage one of the driven transmission gear (n) with the counter gear shaft 12, to achieve a gear shift (to establish a new transmission condition).

Now, the structure of the engaging means 20 will be described below, based on FIGS. 5 to 15.

Figure 9:
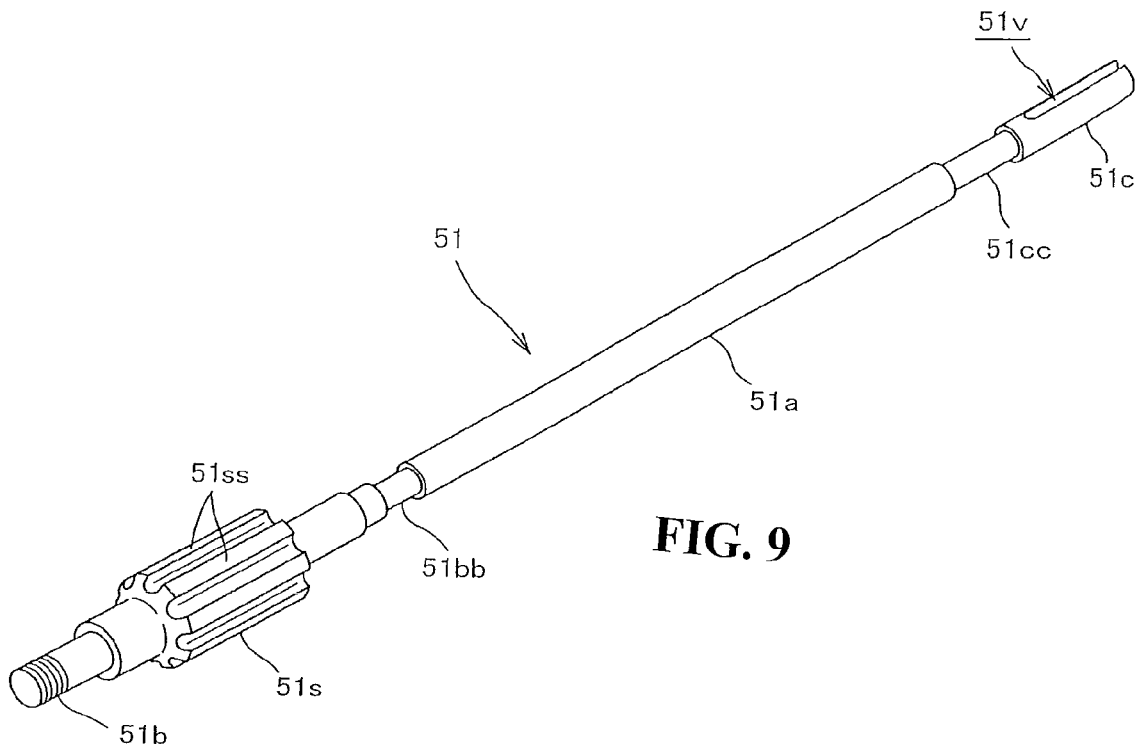
FIG. 9 is a perspective view of a control rod.

First, the control rod 51 of the gear shift driving means 50 will be described referring to FIG. 9.

The control rod 51 is provided with a long central cylindrical part 51a having an outer diameter for sliding contact with the inside of the four cam rods 21, 21, 22, 22; is provided on the left side with a reduced-diameter part 51bb, then a spline part 51s having spline teeth 51ss, and a left-end cylindrical part 51b, sequentially; and is provided on the right side with a reduced-diameter part 51cc, and a right-end cylindrical part 51c in which an engaging groove 51v oriented in the axial direction is cut, sequentially.

The maximum diameter of the spline teeth 51ss of the spline part 51s is approximately equal to the inner diameter of the counter gear shaft 12.

Referring to FIG. 10, as above-mentioned, the fourth first and second cam rods 21, 21, 22, 22 in sliding contact with the periphery of the central cylindrical part 51a of the control rod 51 are substantially in such shapes that a follow cylinder is evenly divided into four sections arrayed in the circumferential direction, and the outer peripheral surfaces as the sliding contact surfaces in sliding contact with the inner peripheral surface of the counter gear shaft 12 are provided with the circumferentially oriented arc-shaped cam grooves 21v, 22v at five required locations along the axial direction.

The cam grooves 21v, 22v are each so formed that the side surfaces on both sides of the groove bottom surface are appropriately inclined to be opened wider apart from each other on the outer side.

Figure 11:
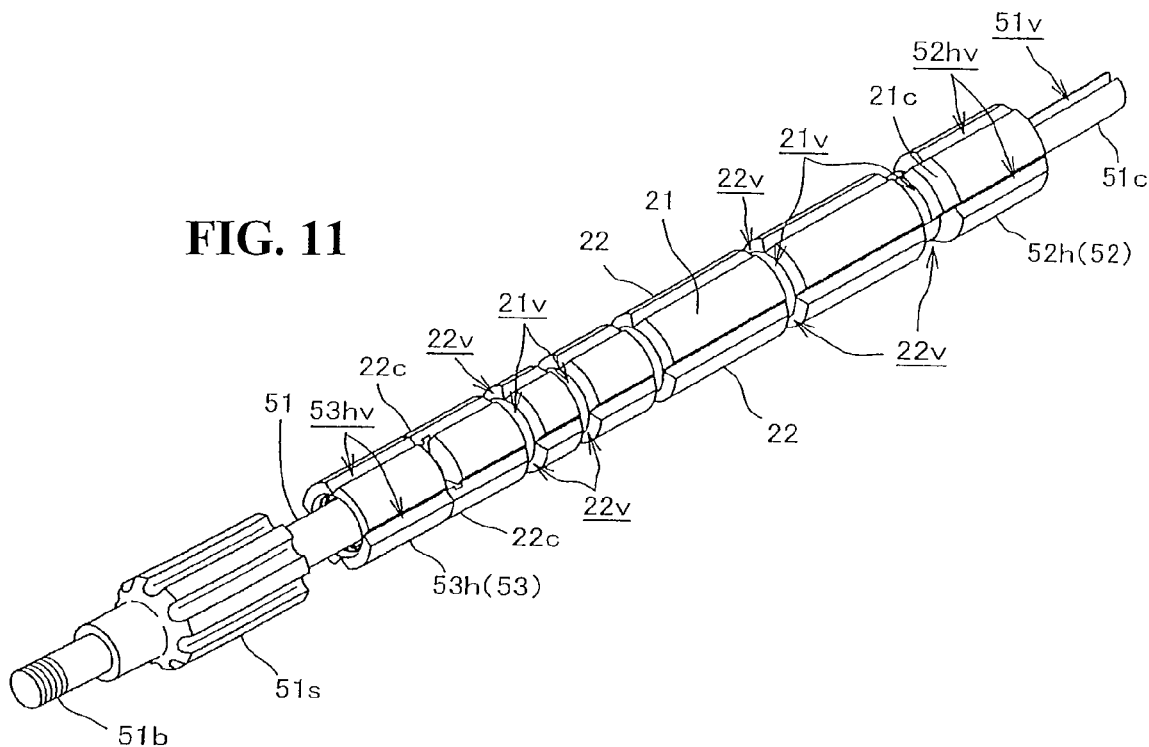
FIG. 11 is a perspective view showing the condition where the cam rods and the lost motion mechanisms are mounted to the control rod.

Incidentally, the mutually contacting both end edges of the outer peripheral surfaces of the first and second cam rods 21, 22 are notched so that, when the adjacent cam rods come into contact with each other, a notch (v) with a V-shaped cross section is formed therebetween (see FIG. 11).

The two first cam rods 21, 21 of the same kind which are located at symmetrical positions have right ends slightly extended and provided with lock claws 21c, 21c, whereas the two second cam rods 22, 22 have left ends slightly extended and provided with lock claws 22c, 22c.

Figure 5:
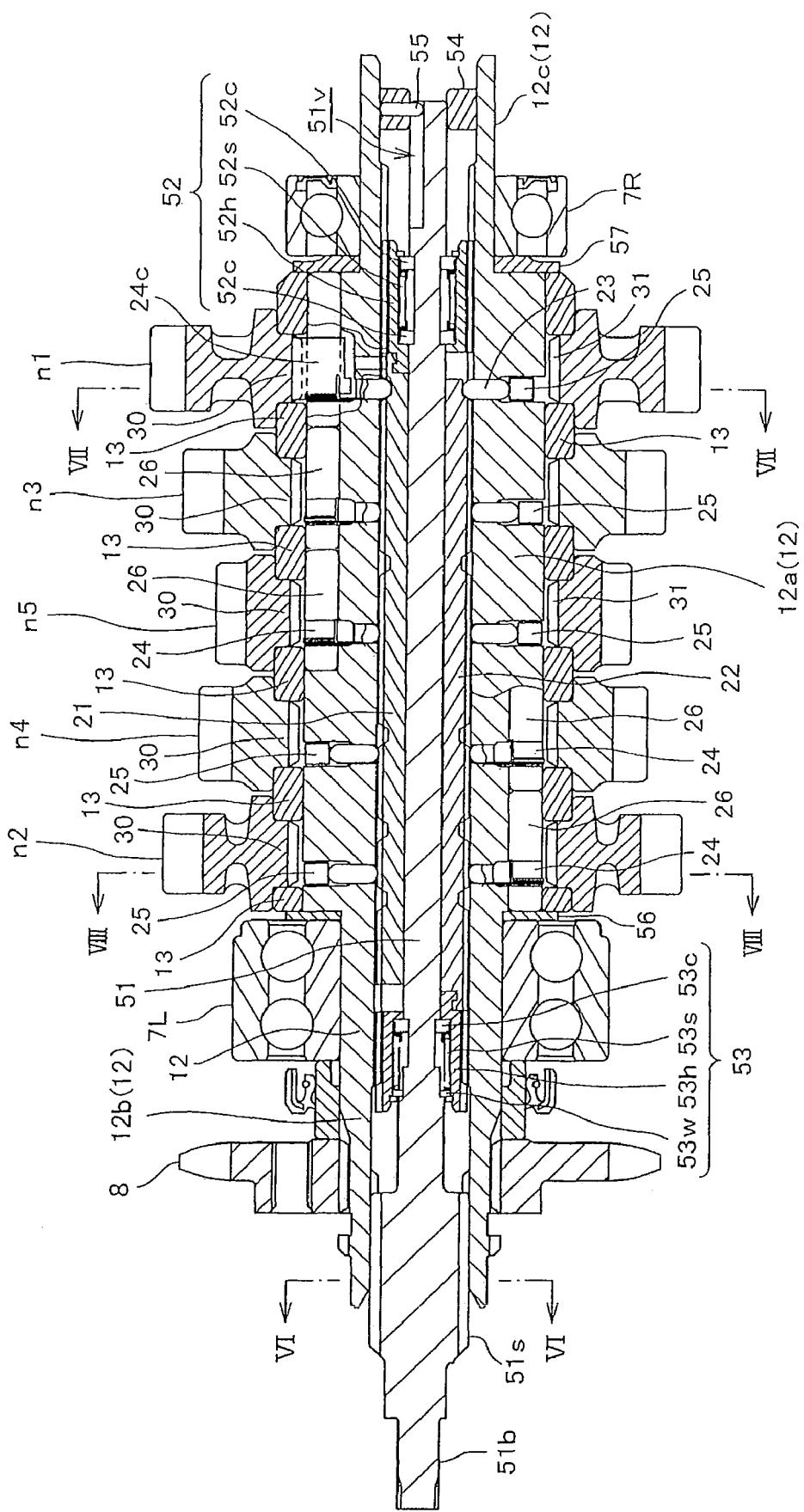
FIG. 5 is a sectional view showing the structure of a counter gear shaft and the surroundings thereof.

The lost motion mechanism 52 on the right side has a spring 52s retained between an inner peripheral recessed part of a hollow cylindrical spring holder 52h, which is slidably fitted around the right-side reduced-diameter part 51cc of the control rod 51, and the reduced-diameter part 51cc, and the spring 52s is clamped between split cotters 52c, 52c on both sides which are each in fit to both the inner peripheral recessed part and the reduced-diameter part 51cc (see FIG. 5).

Symmetrical parts, opposed respectively to the two first cam rods 21 and 21, of the left end surface of the spring holder 52h are projected to form lock claws 52hc, 52hc for locking engagement with the lock claws 21c, 21c of the first cam rods 21, 21.

Similarly, the most motion mechanism 53 on the left side has a spring 53s retained between an inner peripheral recessed part of a hollow cylindrical spring holder 53h, which is slidably fitted around the the left-side reduced-diameter part 51bb of the control rod 51, and the reduced-diameter part 51bb, and the spring 53s is clamped between split cotter 53c and washer 53w on both sides which are in fit to both the inner peripheral recessed part and the reduced-diameter part 51bb.

Symmetrical parts, opposed respectively to the two second cam rods 22 and 22, of the right end surface of the spring holder 53h are projected to form lock claws 53hc, 53hc for locking engagement with the lock claws 22c, 22c of the second cam rods 22, 22.

Incidentally, the outer peripheral surfaces of the spring holders 52h, 53h are provided with notch grooves 52hv, 53hv V-shaped in cross section at four positions at regular angular intervals along the circumferential direction, correspondingly to the notches in the outer peripheral surfaces of the first and second cam rods 21, 22 (see FIGS. 10 and 11).

As shown in FIG. 11, the lost motion mechanisms 53, 52 are mounted to the left and right reduced-diameter parts 51bb, 51cc of the control rod 51, and the four first and second cam rods 21, 21, 22, 22 are put in sliding contact with the outer periphery of the central cylindrical part 51a between the spring holders 52h, 53h.

In this case, the first and second cam rods 21, 22 of the different kinds are circumferentially alternately disposed so that each pair of the cam rods of the same kind are located at symmetrical positions. Besides, the first cam rods 21, 21 have their lock claws 21c, 21c at their right ends in locking engagement with the lock claws 52hc, 52hc of the spring holder 52h on the right side, whereas the second cam rods 22, 22 have their lock pawls 22c, 22c at their left ends in locking engagement with the lock claws 53hc, 53hc of the spring holder 53h on the left side.

In the condition where the four first and second cam rods 21, 21, 22, 22 are mounted on the periphery of the control rod 51 together with the lost motion mechanisms 52, 53 in this manner, the assembly is fitted into the cavity of the hollow cylindrical counter gear shaft 12.

The inner peripheral surface of the counter gear shaft 12 is provided with axially oriented slightly projected ribs at four positions at regular intervals along the circumferential direction, at portions corresponding to the first and second cam rods 21, 21, 22, 22 and the spring holders 52h, 53h. The first and second cam rods 21, 21, 22, 22 and the spring holders 52h, 53h have the V-shaped notches (v) and the notch grooves 52hv, 53hv fitted over the projected ribs of the inner peripheral surface of the counter gear shaft 12, whereby they are positioned and restrained from relative rotation in the circumferential direction while they are kept in sliding contact so as to be movable in the axial direction.

Figure 6:
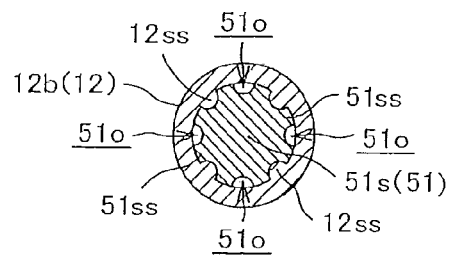
FIG. 6 is a sectional view taken along line VI-VI of FIG. 5.

In addition, the inner peripheral surface of the counter gear shaft 12 is provided, at its portion corresponding to the spline part 51s of the control rod 51, with spline teeth 12ss to be meshed with the spline teeth 51ss on the side of the control rod 51, whereby the control rod 51 is put in sliding contact so as to be movable in the axial direction while being restrained from rotation, relative to the counter gear shaft 12 (see FIGS. 5 and 6).

Incidentally, while eight spline teeth 51ss are provided on the side of the control rod 51, only four spline teeth 12ss are provided on the side of the counter gear shaft 12, and the portions of the missing spline teeth form communicating holes which serve as lubricating oil passages 51o (FIGS. 1, 5 and 6).

Furthermore, as shown in FIG. 5, an annular collar member 54 press fitted into a right-end opening of the counter gear shaft 12 holds a right-end cylindrical part 51c of the control rod 51, and an engaging pin 55 provided to project from the collar member 54 toward the center is engaged in an engaging groove 51v cut in the right-end cylindrical part 51c in an axially oriented manner.

Therefore, the control rod 51 is so supported that it is movable in the axial direction while restrained from rotation, due to the engagement at both ends by the above-mentioned anti-rotation mechanisms, relative to the counter gear shaft 12.

When the control rod 51 and the lost motion mechanisms 52, 53 and the four first and second cam rods 21, 21, 22, 22 are mounted in the cavity of the counter gear shaft 12, all these components are rotated together. Besides, when the control rod 51 is moved in the axial direction, the first cam rods 21, 21 are moved in the axial direction relatively to the counter gear shaft 12 through the spring 52s of the lost motion mechanism 52, and the second cam rods 22, 22 are moved in the axial direction relatively to the counter gear shaft 12 through the spring 53s of the lost motion mechanism 53.

Figure 12:
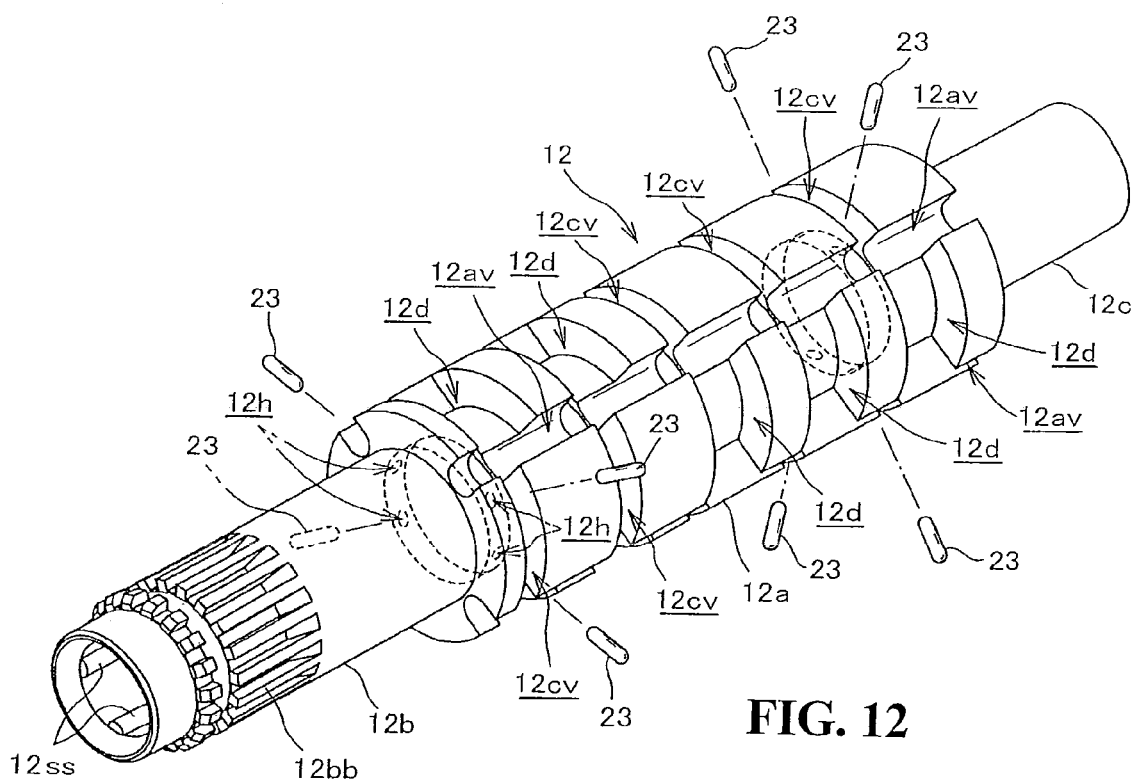
FIG. 12 is an exploded perspective view of the counter gear shaft and pin members.

As shown in a perspective view in FIG. 12, the hollow cylindrical counter gear shaft 12 is provided with a left-side cylindrical part 12b and a right-side cylindrical part 12c which are reduced in outer diameter and are located respectively on both the left and right sides of the central cylindrical part 12a corresponding to the first and second cam rods 21, 21, 22, 22 and bearing the driven transmission gears (n) thereon.

A bearing 7L is fitted over the left-side cylindrical part 12b through a washer 56, and the left-side cylindrical part 12b is partly provided with splines 12bb with which the output sprocket 8 is spline engaged (see FIG. 5).

In addition, a bearing 7R is fitted over the right-side cylindrical part 12c through a washer 57 (see FIG. 5).

As shown in FIG. 12, the central cylindrical part 12a of the counter gear shaft 12 is formed to be large in outer diameter and material thickness. The thick outer peripheral part is provided with five annular circumferential grooves 12cv at regular intervals along the axial direction, and with four axially oriented axial grooves 12av at regular intervals along the circumferential direction.

Furthermore, substantially rectangular recessed parts 12d are formed in required ones of the plurality of sections, demarcated by the five circumferential grooves 12cv and the four axial grooves 12av, of the outer peripheral part of the central cylindrical part 12a of the counter gear shaft 12.

Each of the annular parts demarcated by the circumferential grooves 12cv are demarcated by the four axial grooves 12av into four sections, of which the two symmetrical ones are provided with the recessed parts 12d, and each of the recessed parts 12d shares a common space with the circumferential groove 12cv at the left side thereof.

As shown in FIG. 12, the two recessed parts 12d on the left side in the axial direction and the three recessed parts 12d on the right side are arrayed in rows, with a circumferential stagger of 90 degrees therebetween.

The bottom part of each of the circumferential grooves 12cv is provided with radially extending pin holes 12h at four required locations, and pin members 23 are inserted in the pin holes 12h so that they can advance and recede.

The pin hole 12h penetrates the inner peripheral surface of the cavity of the counter gear shaft 12 and the bottom surface of the circumferential groove 12cv in the radial direction, and the pin member 23 inserted in the pin hole 12h can come into and out of the cavity of the counter gear shaft 12 and can advance and recede while projecting to the side of the circumferential groove 12cv.

Since the first and second cam rods 21, 22 are in sliding contact with the cavity inner peripheral surface of the counter gear shaft 12, when the cam grooves 21v, 22v formed in the sliding contact surfaces of the first and second cam rods 21, 22 are moved to such positions as to face the pin holes 12h, the pin members 23 drop into the cam grooves 21v, 22v, so that the amount of projection thereof to the side of the circumferential groove 12cv is reduced. When the sliding surfaces come to such positions as to face the pin holes 12h, the pin members 23 come out of the cam grooves 21v, 22v, so that the amount of projection thereof to the side of the circumferential groove 12cv is enlarged.

Two kinds of swing claw members 24, 25 are embedded in the recessed parts 12d and the circumferential grooves 12cv in the counter gear shaft 12 structured as above, and pivot pins 26 for swingably supporting the swing claw members 24, 25 are embedded in the axial grooves 12av.

Figure 13:
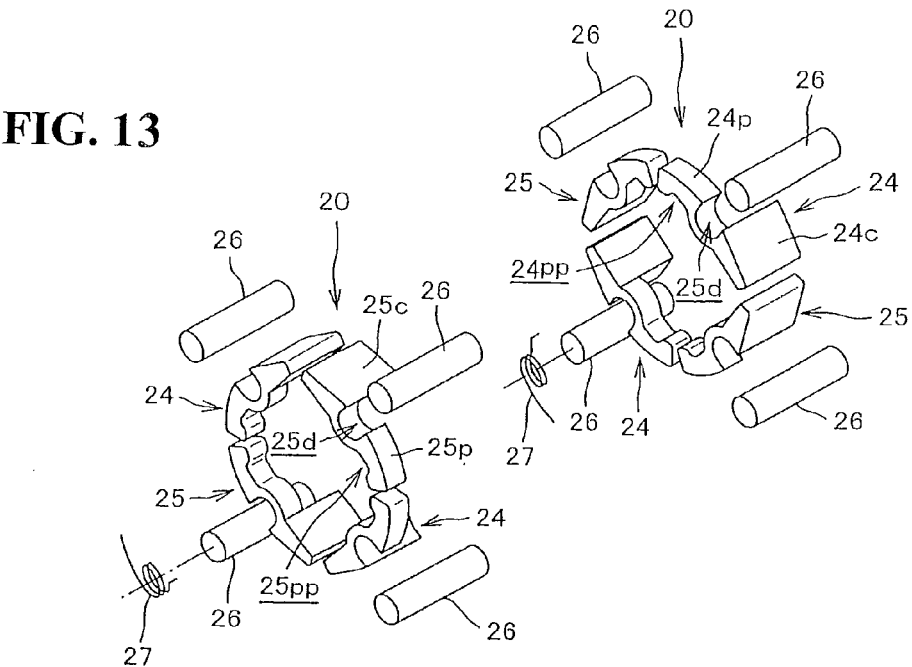
FIG. 13 shows perspective views of swing pawl members and pivot pins.

FIG. 13 shows an exploded perspective views of the most-right-side circumferential groove 12cv and the four swing claw members 24, 24, 25, 25 embedded in the recessed part 12*d* on its right side and the pivot pins 26 therefor, and the most-left-side circumferential groove 12*cv* and the four swing claw members 24, 24, 25, 25 embedded in the recessed part 12*d* on its right side and the pivot pins 26 therefore.

The swing claw member 24, 25 is substantially arc-shaped as viewed in the axial direction, and is provided in its center with a bearing recessed part 24*d*, 25*d* (as a through-hole whose outer circumferential part is partly lost) through which to pass the pivot pin 26. A pin receiving part 24*p*, 25*p* is extended on one side of the swinging center of the bearing recessed part 24*d*, 25*d*, and an engaging claw part 24*c*, 25*c* is extended on the other side.

The pin receiving part 24*p*, 25*p* has a small axial width for swingable fit in the circumferential groove 12*cv*, and is provided in its inner peripheral surface with a pin receiving recessed part 24*pp*, 25*pp* for receiving the pin member 24*p*, 25*p*. The engaging claw part 24*c*, 25*c* on the other side has a large axial width for swingably fit in the recessed part 12*d*, and is formed in a tapered shape as viewed in the axial direction.

The large-width engaging claw parts 24*c*, 25*c* are heavier than the small-width pin members 24*p*, 25*p*, so that they act as pendulums in turning, so as to swing the swing claw members 24, 25 through centrifugal forces.

The two kinds of the swing claw members 24, 25 are mirror images of each other.

The pivot pins 26 are fitted in the bearing recessed parts 24*d*, 25*d* so as to swingably support the swing claw members 24, 25.

The swing claw members 24, 25 are embedded in the recessed parts 12*d* and the circumferential grooves 12*cv* in the counter gear shaft 12, whereas the pivot pins 26 are fitted in the bearing recessed parts 24*d*, 25*d* of the swing claw members 24, 25 and embedded in the axial grooves 12*av*.

In each recessed part 12*d* of the counter gear shaft 12, the engaging claw parts 24*c*, 25*c* of the swing claw members 24, 25 adjacent in the circumferential direction are embedded so that their tips face each other through a predetermined gap therebetween.

As torsion coil springs 27 are shown in parts of FIG. 13, the torsion coil spring 27 is wound around each pivot pin 26. The torsion coil spring 27 is so mounted that one end of the torsion coil spring 27 is internally locked to the side of the engaging claw part 24*c*, 25*c* of the swing claw member 24, 25, and the other end is put in contact with the bottom surface of the recessed part 12*d*, whereby the swing claw member 24, 25 is urged so as to swing the engaging claw part 24*c*, 25*c* toward the outside.

The pin member 23 acts to internally push up the pin receiving part 24*p*, 25*p* on one side of the swing claw member 24, 25, and, therefore, it swings the swing claw member 24, 25 against the urging force exerted by the torsion coil spring 27.

Now, the procedure for mounting the above-described engaging means 20 to the counter gear shaft 12 will be described below.

First, as above-mentioned, the lost motion mechanisms 52, 53 and the four first and second cam rods 21, 21, 22, 22 are mounted onto the periphery of the control rod 51 to obtain the mounted (assembled) condition as shown in FIG. 11, and the assembly is inserted into the inner cavity of the counter gear shaft 12.

Figure 7:
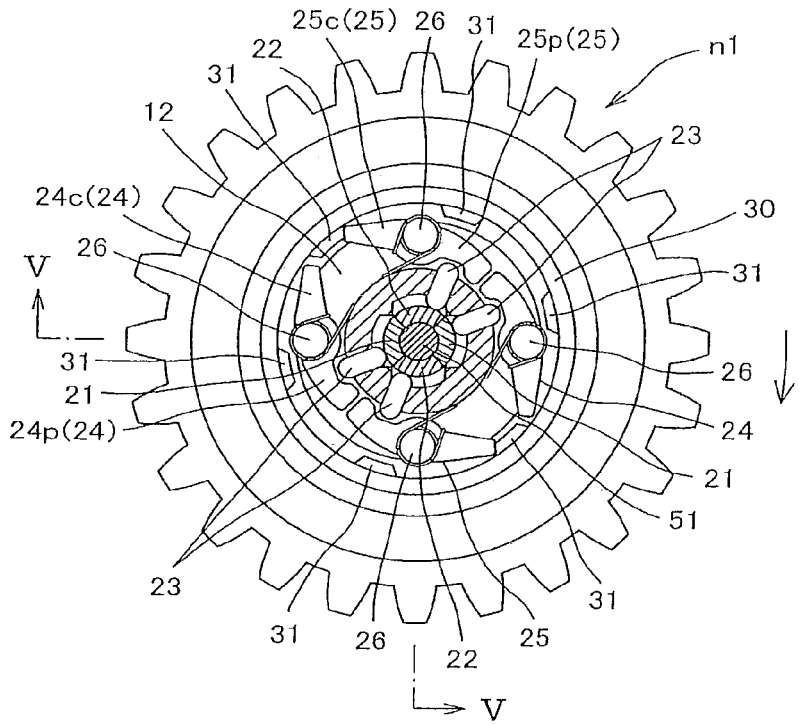
FIG. 7 is a sectional view taken along line VII-VII of FIG. 5.
Figure 8:
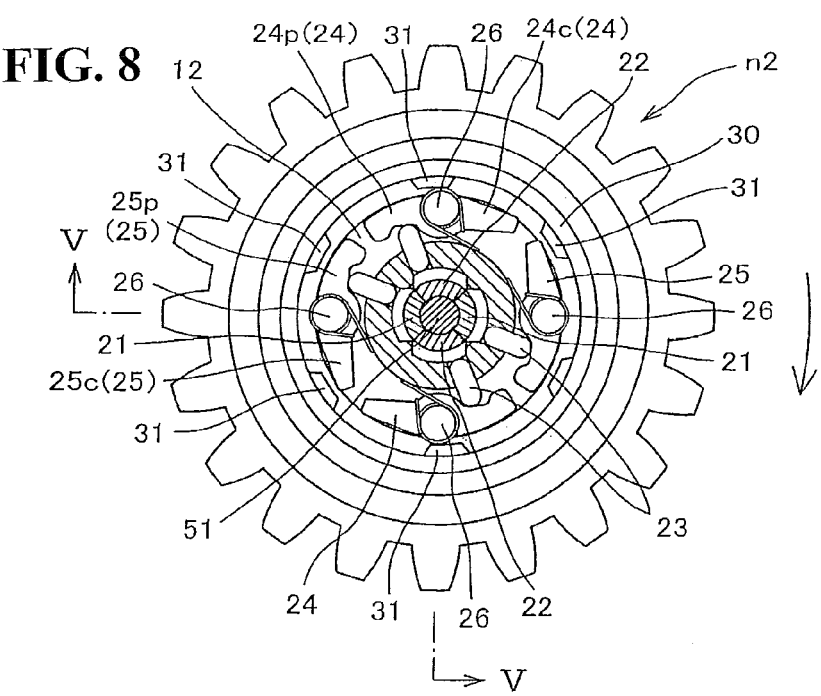
FIG. 8 is a sectional view taken along line VIII-VIII of FIG. 5.

In this case, the first and second cam rods 21, 21, 22, 22 are so positioned as to correspond, on the basis of position in the circumferential direction, respectively to the axial grooves 12*av* in the counter gear shaft 12, and the pin holes 12*h* are situated to face the sliding contact surfaces of the first and second cam rods 21, 21, 22, 22 (see FIGS. 7 and 8).

A setting is made such that the moving position in the left-right direction of each of the four first and second cam rods 21, 21, 22, 22 in relation to the counter gear shaft 12 is in a neutral position.

When the pin members 23 are inserted in the pin holes 12*h* formed in the circumferential grooves 12*cv* in the counter gear shaft 12 under this condition, all the pin members 23 abut on the sliding contact surfaces of the first and second cam rods 21, 21, 22, 22, so that the amount of projection thereof from the circumferential grooves 12*cv* is set to be large.

Then, in the condition where the pivot pins 26 with the torsion coil springs 27 wound thereon are fitted in the bearing recessed parts 24*d*, 25*d* of the swing claw members 24, 25, the swing claw members 24, 25 are embedded in the recessed parts such as the recessed parts 12*d*, the circumferential grooves 12*cv*, the axial grooves 12*av*, etc. formed in the outer periphery of the counter gear shaft 12.

Figure 14:
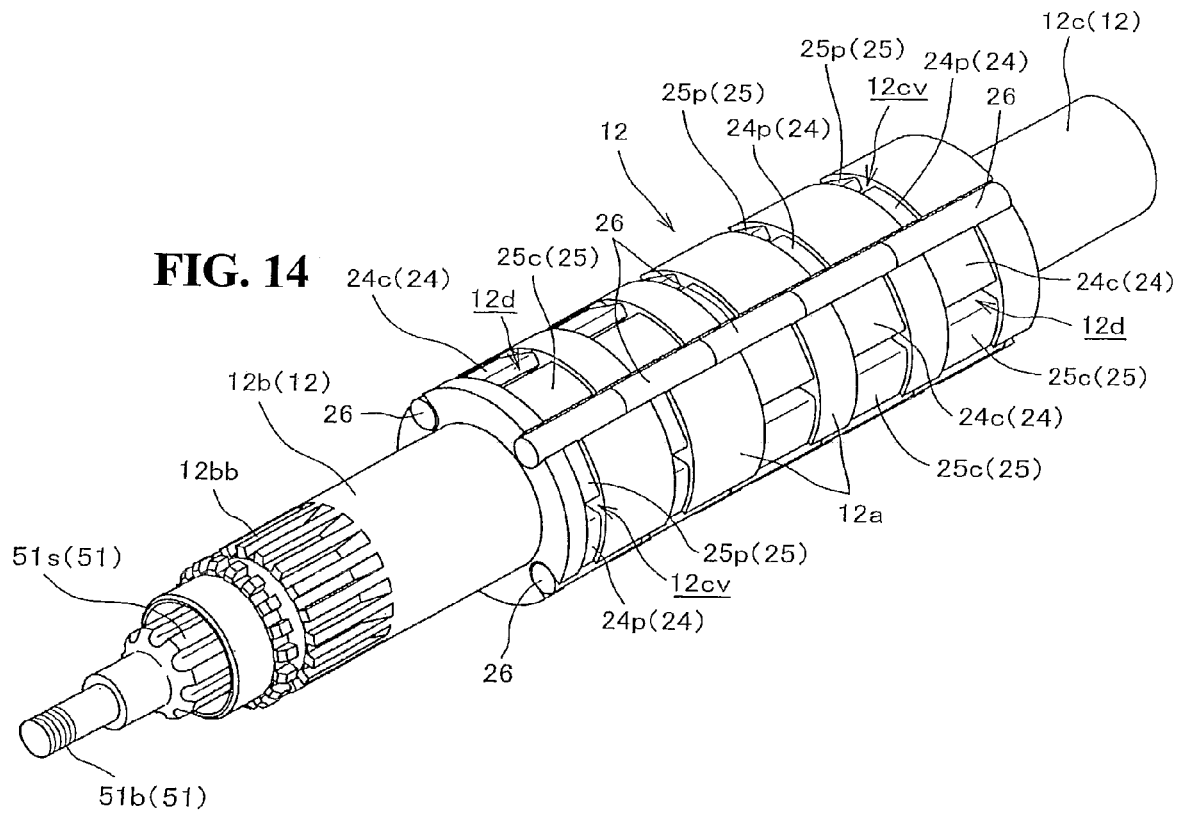
FIG. 14 is a perspective view showing the condition where the swing claw members, pivot pins, the cam rods, the control rods and the like are mounted to the counter gear shaft.

The swing claw member 24, 25 is in such a condition that the pin receiving part 24*p*, 25*p* on one side is internally pushed up by the largely projecting pin member 23 against the urging force exerted by the torsion coil spring 27, so as to pull the engaging claw part 24*c*, 25*c* on the other side inwards; therefore, as shown in FIG. 14, no component is projecting outwards from the outer peripheral surface of the central cylindrical part 12*a* of the counter gear shaft 12.

Incidentally, when the pin member 23 drops into the cam groove 21*v*, 22*v* in the relevant one of the first and second cam rods 21, 22 and the swing claw member 24, 25 is swung about the pivot pin 26 by the urging force of the torsion coil spring 27 and the centrifugal force of the engaging claw part 24*c*, 25*c* heavier than the pin receiving part 24*p*, 25*p*, the engaging claw part 24*c*, 25*c* is projected outwards beyond the outer peripheral surface of the central cylindrical part 12*a* of the counter gear shaft 12.

In the condition where the engaging means 20 is mounted into the counter gear shaft 12 shown in FIG. 14 and no component is projecting outwards beyond the outer peripheral surface of the central cylindrical part 12*a*, the bearing collar members 13 are sequentially fitted over the assembly.

The bearing collar members 13 are externally fitted over the central cylindrical part 12*a* into other axial-direction positions than the recessed parts 12*d*, and are located to bridgingly cover the adjacent ones 26, 26 of the pivot pins 26 embedded in the axial groove 12*av* in succession and in a row, thereby preventing the pivot pins 26 and the swing claw members 24, 25 from coming out of position.

The pivot pins 26 embedded in the axial grooves 12*av* in the central cylindrical part 12*a* of the counter gear shaft 12 are embedded to such a depth as to make contact with the outer peripheral surface of the central cylindrical part 12*a*, so that they are fixed without any chattering once the bearing collar members 13 are fitted externally.

The six bearing collar members 13 are externally fitted over the counter gear shaft 12 at regular intervals, and the driven transmission gears (n) are rotatably borne thereon in the manner of bridingly covering the adjacent bearing collar members 13, 13.

Each driven transmission gear (n) is provided with notches at its left and right inner peripheral edge parts (left and right peripheral edge parts of the inner peripheral surface thereof) so that a small-material-thickness annular projected rib 30 is formed between the left and right notches, and the left and right bearing collar members 13, 13 are slidably engaged with the notches in the manner of clamping the projected rib 30 therebetween (see FIGS. 5, 7 and 8).

The projected rib 30 at the inner peripheral surface of each driven transmission gear (n) is provided with engaging projected parts 31 at six locations at regular intervals along the circumferential direction.

Each engaging projected part 31 is in a small-material-thickness arc-shaped form in side view (as viewed in the axial direction, as shown in FIGS. 7 and 8), and both its end surfaces in the circumferential direction constitute engaging surfaces for engagement with the engaging claw parts 24c, 25c of the swing claw members 24, 25.

The swing claw member 24 and the swing claw member 25 have their engaging claw parts 24c, 25c extending on the sides for facing each other, and the swing claw member 24 abuts on and is engaged with the engaging projected part 31 in the rotational direction of the driven transmission gears (n) (and the counter gear shaft 12), whereas the swing claw member 25 abuts on and is engaged with the engaging projected part 31 in the counter-rotational direction of the driven transmission gears (n).

Incidentally, the swing claw member 24 would not be engaged in the counter-rotational direction of the driven transmission gears (n) even if its engaging claw part 24c is projecting outwards; similarly, the swing claw member 25 would not be engaged in the rotational direction of the driven transmission gears (n) even if its engaging claw part 25c is projecting outwards.

In practice, the process of mounting the engaging means 20 and the like to the counter gear shaft 12 and mounting the five driven transmission gears (n) is conducted as follows.

First, the control rod 51, the cam rods 21, 22 and the lost motion mechanisms 52, 53 assembled together into the state shown in FIG. 11 is inserted into the counter gear shaft 12 as above-mentioned, the pin members 23 are preliminarily inserted in the pin holes 12h, and this assembly is erected with the left portion up.

Figure 15:
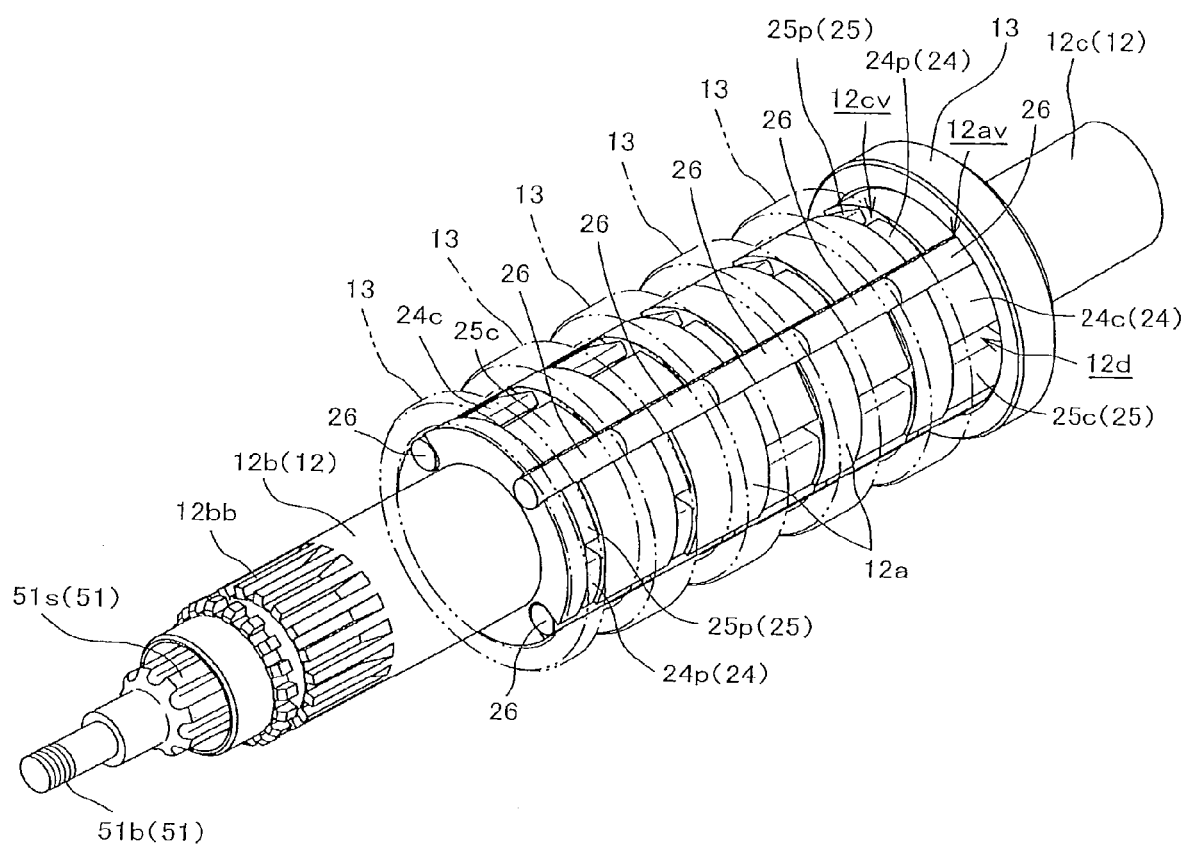
FIG. 15 is a perspective view showing the condition where one bearing collar member has been externally fitted over the counter gear shaft in the state shown in FIG. 14.

Then, first, the right-end bearing collar member 13 is externally fitted over the lower end (right end) of the central cylindrical part 12a as indicated by solid lines in FIG. 15, and the engaging means 20 (the swing claw members 24, 25, the pivot pins 26, and the torsion coil springs 27) for the 1st driven transmission gear nil is mounted into position. Next, the 1st driven transmission gear n1 is fitted over from above to be mounted into position so that the projected rib 30 of the 1st driven transmission gear n1 abuts on the bearing collar member 13 and the notch is engaged. Subsequently, the second bearing collar member 13 is fitted over from above to be engaged with the notch in the 1st driven transmission gear n1, thereby being externally mounted into a predetermined position on the counter gear shaft 12 and positioning the 1st driven transmission gear n1 in the axial direction.

Next, the engaging means 20 for the 3rd driven transmission gear n3 is mounted into position, the 3rd driven transmission gear n3 is mounted into position, and, then on this procedure is repeated to sequentially mount the remaining 5th, 4th, and 2nd driven transmission gears n5, n4, n2 into respective positions, followed finally by externally mounting the sixth bearing collar member 13.

In the condition where the five driven transmission gears (n) are thus mounted on the counter gear shaft 12, the counter gear shaft 12 is rotatably borne on the left and right bearings 7L, 7R attached to the side walls of the left engine case 1L and the right engine case 1R in the manner of being clamped therebetween through the collar members 14L, 14R, as shown in FIG. 1, resulting in that the five driven transmission gears (n) and the six bearing collar members 13 are clamped from the left and right sides in an alternately arranged state and are positioned in the axial direction.

The bearing collar members 13 can bear the axial forces concerning the driven transmission gears (n), and can therefore ensure positioning of the driven transmission gears (n) in the axial direction and receive thrust forces therefrom.

In this manner, the 1st, 3rd, 5th, 4th, and 2nd driven transmission gears n1, n3, n5, n4, n2 are rotatably borne on the counter gear shaft 12 through the bearing collar members 13.

Since the first and second cam rods 21, 22 are each in the neutral position, all the driven transmission gears (n) are in a disengaged condition where, according to the moving positions of the first and second cam rods 21, 22 of the corresponding engaging means 20, the pin members 23 are projected to internally push up the pin receiving parts 24p, 25p of the swing claw members 24, 25 and withdraw the engaging claw parts 24c, 25c inwards; thus, all the driven transmission gears (n) are freely rotatable in relation to the counter gear shaft 12.

On the other hand, in an engaged condition where, according to the moving positions of the cam rods 21, 22 of the engaging means 20 other than the neutral positions, the pin members 23 enter the cam grooves 21v, 22v and the swing claw members 24, 25 are swung so that the engaging claw parts 24c, 25c are projected outwards, the engaging projected parts 31 of the relevant driven transmission gear (n) abut on the engaging projected parts 24c, 25c. As a result, the rotation of the relevant driven transmission gear (n) is transmitted to the counter gear shaft 12, or the rotation of the counter gear shaft 12 is transmitted to the relevant driven transmission gear (n).

In the above-mentioned gear shift driving means 50, when the gear shift driving motor 60 is driven and the Geneva driving gear 62 is rotated by one revolution, the shift drum 65 is rotated by 60 degrees by the ⅙-revolution Geneva stop mechanism, and the guide pin 76 engaged with the guide groove 65v in the shift drum 65 is guided to move the control rod operating element 70, which is integral with the guide pin 76, by a predetermined amount in the axial direction.

The control rod operating element 70 moved the control rod 51 together by the predetermined amount in the axial direction through the two ball bearings 71, 71. The movement of the control rod 51 in the axial direction moves, in conjunction, the first and second cam rods 21, 22 in the axial direction through the springs 52s, 53s of the lost motion mechanisms 52, 53.

With the first and second cam rods 21, 22 thus moved in the axial direction, the pin members 23 in sliding contact with the first and second cam rods 21, 22 in the engaging means 20 come into or out of the cam grooves 21v, 22v to swing the swing claw members 24, 25 so that the latter are disengaged from one driven transmission gear (n) and engaged with another driven transmission gear (n), whereby the driven transmission gear (n) engaged with the counter gear shaft 12 is changed over, i.e., a gear shift is achieved.

Incidentally, while driving the gear shift driving motor 60 so as to make a gear shift is used as the gear shift driving means, a mechanism may be adopted in which the driver operates a gear shift lever or the like to advance or retreat a cable, whereby the shift drum is rotated through the function of a Geneva stop mechanism or the like, thereby achieving a gear shift.

Now, the process of an upshift from the 1st gear speed condition to the 2nd gear speed condition (which is one step lower in reduction gear ratio than the 1st gear speed condition) at the time of acceleration by driving the internal combustion engine will be described below, referring to FIGS. 16 to 21.

FIGS. 16(a) to 21(c) illustrate changes with time, and in each of the drawings, FIG. (a) is a sectional view showing the structure of the counter gear shaft 12 and the surroundings thereof, FIG. (b) is a sectional view (sectional view of 2nd driven transmission gear n2) taken along line b-b of FIG. (a), and FIG. (c) is a sectional view (sectional view of the 1st driven transmission gear n1) taken along line c-c of FIG. (a).

The motive power of the internal combustion engine is transmitted through the frictional clutch 5 to the main gear shaft 11, whereby the 1st, 3rd, 5th, 4th, and 2nd drive transmission gears m1, m3, m5, m4, m2 are rotated as one body, and the 1st, 3rd, 5th, 4th, and 2nd driven transmission gears n1, n3, n5, n4, n2 normally meshed respectively with them are thereby rotated at respective rotating speeds.

Figure 16A:
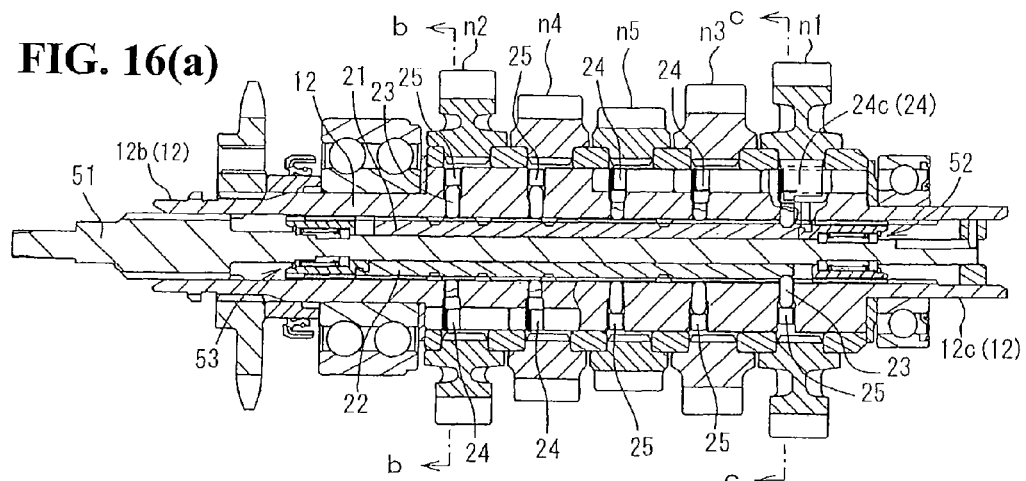
FIGS. 16($a$)-($c$) illustrates the 1st gear speed condition at the time of starting an upshift.
Figure 16B:
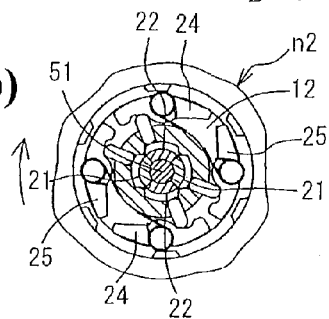

FIG. 16(a) illustrates the 1st gear speed condition. In FIG. 16(b), the 2nd driven transmission gear n2 is being rotated in the direction of arrow, and, in FIG. 16(c), the 1st driven transmission gear n1 is rotated in the direction of arrow. In this case, the 2nd driven transmission gear n2 is rotated at a higher speed than the 1st driven transmission gear n1.

Figure 16C:
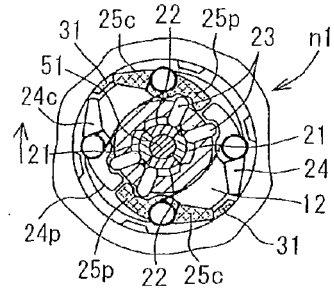

Only the pin members 23 in the engaging means 20 corresponding to the 1st driven transmission gear n1 are disposed in the cam grooves 21v, 22v in the first and second cam rods 21, 22, so that the swing claw members 24, 25 in this engaging means 20 project their engaging pawl parts 24c, 25c outwards, and the engaging projected parts 31 of the 1st driven transmission gear n1 being rotated are engaged with the engaging claw parts 25c of the swing claw members 25 (see FIG. 16(c)), whereby the counter gear shaft 12 is rotated together with the 1st driven transmission gear n1 at the same rotating speed as that of the 1st driven transmission gear n1.

Incidentally, in FIGS. 16(a)-(c) to 24(a)-(c), the swing claw members 24, 25 and the engaging projected parts 31 which are effectively transmitting motive power are cross-hatched.

In this 1st gear speed condition, the pin members 23 in the engaging means 20 corresponding to the 2nd driven transmission gear n2 have come out of the cam grooves 21v, 22v in the first and second cam rods 21, 22 to project, and the swing claw members 24, 25 of this engaging means 20 retreat their engaging claw parts 24c, 25c inwards, so that the 2nd driven transmission gear n2 is in idle rotation.

The other, 3rd, 4th, and 5th driven transmission gears n3, n4, n5 are similarly in idle rotation (see FIG. 16(b)).

Here, when the gear shift driving motor 60 is driven in order to make a gear shift into the 2nd gear speed and the control rod operating element 70 beings to be moved rightward in the axial direction, it tends to move, in conjunction, the first and second cam rods 21, 22 rightward in the axial direction through the springs 52s, 53s of the lost motion mechanisms 52, 53.

Figure 17A:
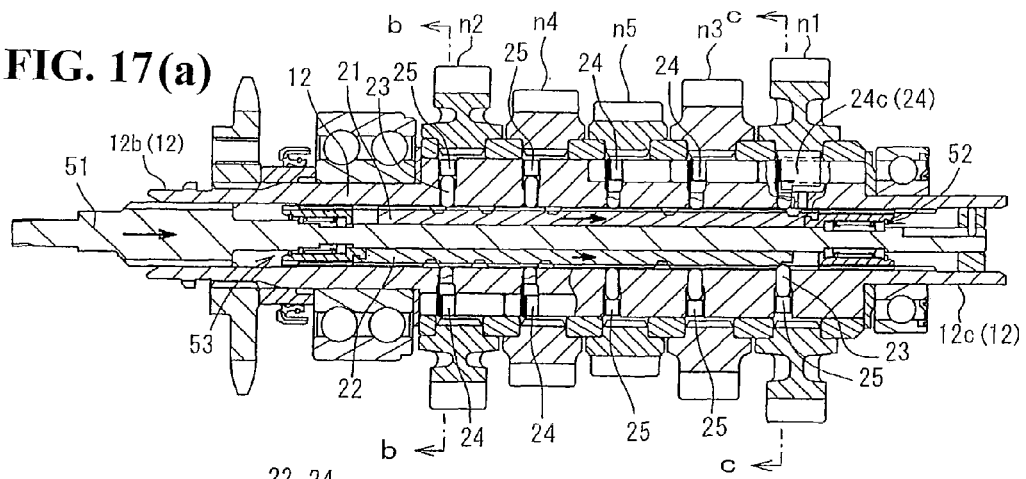
FIGS. 17($a$)-($c$) illustrate one step in the course of the upshift work.
Figure 17B:
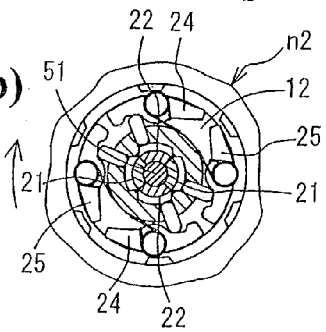
Figure 17C:
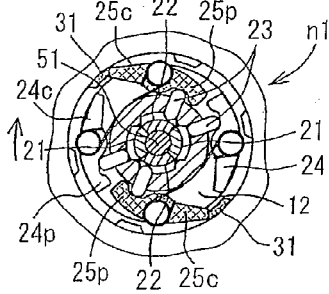

Referring to FIGS. 17(a) to (c), in the first cam rods 21 on one hand, the swing claw members 24 operated through the pin members 23 are not in engagement with the engaging projected parts 31 of the 1st driven transmission gear n1, and are therefore moved with little resistance, so as to cause the pin members 23 having been engaged with the cam grooves 21v to come out of the cam grooves 21v and project, thereby swinging the swing pawl members 24, whereby the engaging pawl parts 24c are gradually retreated inwards (see FIGS. 17(a) to (c)).

In the second cam rods 22 on the other hand, the swing claw members 25 operated through the pin members 23 are in engagement with the engaging projected parts 31 of the 1st driven transmission gear n1 and are receiving motive power from the 1st driven transmission gear n1, so that a considerably great frictional resistance is experienced in swinging the swing claw members 25 for disengaging the latter. Therefore, even if the second cam rods 22 are moved by the force of the spring 53s of the lost motion mechanism 53 to urge the pin members 23 to project along the inclined side surfaces of the cam grooves 22v, it is impossible to push up and swing the swing claw members 25. As a result, the cam rods 22 are stopped at the time when the pin members 23 are about to rise along the inclined side surfaces of the cam grooves 22v, and the engagement is kept unreleased (see FIGS. 17(a) to (c)).

In the condition shown in FIGS. 17(a) to (c), in the 2nd driven transmission gear n2, the pin members 23 are not disposed in the cam grooves 21v in the first cam rods 21, so that the swing claw members 25 show no changes, and the swing claw members 24 also show no change because the second cam rods 22 are at rest (see FIG. 17(b)).

When the control rod operating element 70 is moved further rightwards under the condition where the second cam rods 22 are at rest, the first cam rods 21 are also moved rightwards. As a result, referring to FIGS. 18(a) to (c), in the 1st driven transmission gear n1, the pin members 23 come out of the cam grooves 21v of the first cam rods 21 and project so as to swing the swing claw members 24, thereby retreating the engaging claw parts 24c completely to the inner side (see FIG. 18(c)). In addition, in the 2nd driven transmission gear n2, the pin members 23 enter the cam grooves 21v of the first cam rods 21, and the swing claw members 25 are swung by the urging forces of the torsion coil springs 27 and the centrifugal forces of their engaging claw parts 25c, to project the engaging claw parts 25c outwards (see FIG. 18(b)).

Then, the engaging projected parts 31 of the 2nd driven transmission gear n2 rotated at a higher speed than the counter gear shaft 12 rotated together with the 1st driven transmission gear n1 catch up with and abut on the outwardly projected engaging claw parts 25c of the swing claw members 25 (see FIG. 19(b)).

In this instance, referring to FIGS. 19(b) and 19(c), there is a moment that the engaging projected parts 31 of the 2nd driven transmission gear n2 and the engaging projected parts 31 of the 1st driven transmission gear n2 are simultaneously abutted on the engaging claw parts 25c, 25c of the respective swing claw members 25, 25.

Therefore, immediately upon this moment, the counter gear shaft 12 is started rotating at the same rotating speed as that of the 2nd driven transmission gear n2 by the 2nd driven transmission gear n2 rotating at a higher speed (see FIG. 20(b)), whereas the engaging claw parts 25c of the swing claw members 25 are gradually separated from the engaging projected parts 31 of the 1st driven transmission gear n1 (see FIG. 20(c)), whereby a practical upshift from the 1st gear speed to the 2nd gear speed is carried out.

While the movement of the control rod operating element 70 ends at this point, the gear shift work goes further on. With the engaging claw parts 25c of the swing claw members 25 separated from the engaging projected parts 31 of the 1st driven transmission gear n1, the frictional resistance fixing the swing claw members 25 is eliminated. Therefore, the second cam rods 22 having been urged by the spring 53s of the lost motion mechanism 53 are moved rightwards, and the pin members 23 having been engaged with the cam grooves 22v begin to come out of the cam grooves 22v to swing the swing claw members 25, thereby gradually retreating the engaging claw parts 25c inwards (see FIG. 20(c)).

Then, with the second cam rods 22 moved further rightwards, the pin members 23 in the 1st driven transmission gear n1 come completely out of the cam grooves 22v, so that the engaging claw parts 25c of the swing claw members 25 are completely retreated to the inner side (see FIG. 21(c)). In addition, in the 2nd driven transmission gear n2, the pin members 23 enter the cam groove 22v, and the swing claw members 24 are swung by the urging forces of the torsion coil springs 27 and the centrifugal forces of their engaging claw parts 24c, to project the engaging claw parts 24c outwards (see FIG. 21(b)).

In this condition, the gear shift work from the 1st gear speed to the 2nd gear speed is completed.

Thus, in the process of the upshift from the 1st gear speed condition to the 2nd gear speed condition (which is one step lower in reduction gear ratio than the 1st gear speed condition), in the condition where the engaging projected parts 31 in the 1st driven transmission gear n1 are in abutment on and in engagement with the engaging claw parts 25c of the swing claw members 25 so that the counter gear shaft 12 is thereby being rotated at the same speed as the first driven transmission gear n1, as shown in FIGS. 19(a) to (c), the engaging projected parts 31 of the 2nd driven transmission gear n2 rotating at a higher speed catch up with and abut on the engaging claw parts 25c of the swing claw members 25, whereby the counter gear shaft 12 is rotated at a higher speed together with the 2nd driven transmission gear n2, and the gear shift is achieved. Therefore, the engaging claw parts 25c of the swing claw members 25 are gradually separated from the engaging projected parts 31 in the 1st driven transmission gear n1 in a natural manner, and the engagement is thereby released smoothly. Accordingly, no force is needed to release the engagement, and smooth operations and a smooth upshift can be achieved.

An upshift from the 2nd to the 3rd gear speed, an upshift from the 3rd to the 4th gear speed, and an upshift from the 4th to the 5th gear speed can also be performed smoothly. Specifically, in these upshifts, in the condition where one driven transmission gear (n) is in engagement with the swing claw members 24, another driven transmission gear (n) which is one step lower in reduction gear ratio than the one driven transmission gear (n) is engaged with the swing claw members 24, to make the upshift. Therefore, no force is needed to release the engagement, smooth operations are ensured, and there is no need for a clutch for gear shift. In addition, there is utterly no loss in changeover time at the time of making an upshift, a loss of the driving force is avoided, the shift shock is small, and a smooth upshift can be achieved.

For example, in the 1st gear speed condition, as shown in FIG. 16(c), the swing claw members 25 are in engagement with the engaging projected parts 31 in the 1st driven transmission gear n1, and, simultaneously, the engaging claw parts 24c of the swing claw members 24 on the other hand are in an engageable state in proximity to the engaging projected parts 31.

Therefore, when due to vehicle deceleration a driving force is applied from the rear wheel to the counter gear shaft 12 and the direction of the driving force is thus changed, the engagement of the engaging projected parts 31 in the 1st driven transmission gear n1 is speedily switched from the engagement with the swing claw members 25 to the engagement with the swing claw members 24, whereby the engagement can be smoothly handed over and maintained.

Besides, in the case of the upshift from the 1st to the 2nd gear speed, the engaging claw parts 24c of the swing claw members 24 in the 1st driven transmission gear n1 are retreated inwards from the engageable state before the engaging projected parts 31 in the 2nd driven transmission gear n2 are engaged with the swing claw members 25; therefore, these swing claw members 24 would not obstruct the gear shift (see FIG. 19(c)), and smooth and assured engagement and disengagement are performed.

Now, the process of a downshift from the 2nd gear speed condition to the 1st gear speed condition (which is one step higher in reduction gear ratio than the 2nd gear speed condition) at the time of vehicle deceleration will be described below, referring to FIGS. 22 to 24.

Figure 22A:
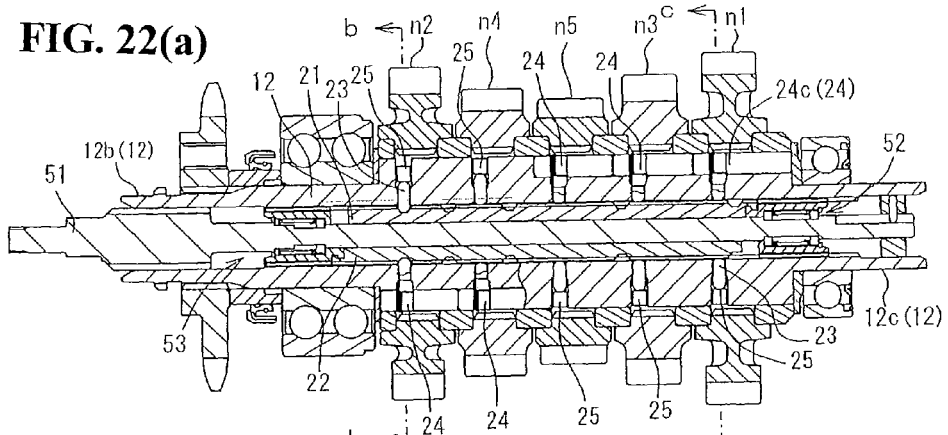
FIGS. 22($a$)-($c$) illustrates the 2nd gear speed condition at the time of starting a downshift.
Figure 22B:
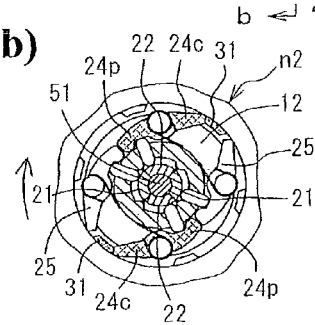
Figure 22C:
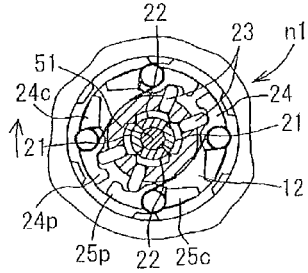
Figure 23A:
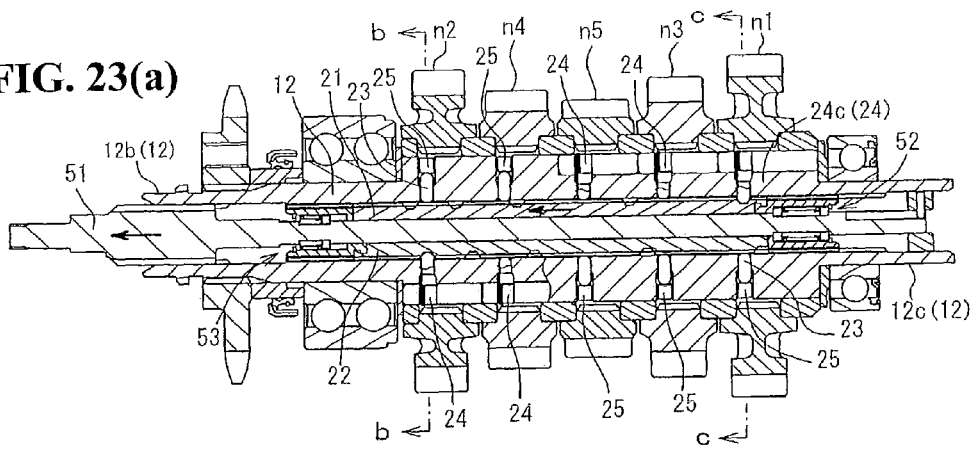
FIGS. 23($a$)-($c$) illustrates one step in the course of the downshift work.

FIGS. 22(a) to (c) illustrate the condition immediately upon a deceleration under the 2nd gear speed condition.

Due to the deceleration, a driving force is applied from the rear wheel to the counter gear shaft 12. Consequently, as shown in FIG. 22(b), the engaging claw parts 24c of the swing claw members 24 which have been in an engageable state come into engagement with the engaging projected parts 31 in the 2nd driven transmission gear n2 lowered in rotating speed, so that the rotating power of the counter gear shaft 12 is transmitted to the 2nd driven transmission gear n2. In other words, the so-called engine brake is being applied.

When the control rod operating element 70 is moved leftwards in the axial direction by driving of the gear shift driving motor 60 for the purpose of making a downshift to the 1st gear speed under this condition, the control rod operating element 70 urges the first and second cam rods 21, 22 to move, in conjunction, leftwards in the axial direction through the springs 52s, 53s of the lost motion mechanisms 52, 53. However, since the second cam rods 22 are receiving motive power from the 2nd driven transmission gear n2 because the swing claw members 24 operated through the pin members 23 are in engagement with the engaging projected parts 31 in the 2nd driven transmission gear n2, a considerably large frictional resistance is involved in swinging the swing claw members 24 so as to disengage the latter. Therefore, the second cam rods 22 are stopped at the moment that the pin members 23 are about to rise along the inclined side surfaces of the cam grooves 22v, so that the engagement of these swing claw members 24 is left unreleased.

Figure 23B:
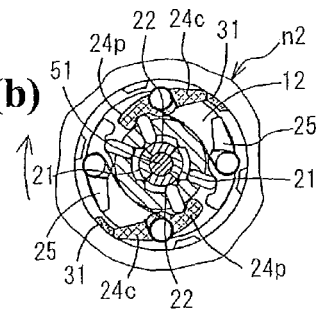

On the other hand, since the swing claw members 25 operated through the pin members 23 are not in engagement with the engaging projected parts in the 2nd driven transmission gear n2, the first cam rods 21 are moved leftwards with little resistance so that the pin members 23 having been engaged with the cam grooves 21v of the first cam rods 21 come out of the cam grooves 21v and project to swing the swing claw members 25, thereby retreating the engaging claw parts 25c inwards (see FIG. 23(b)).

Figure 23C:
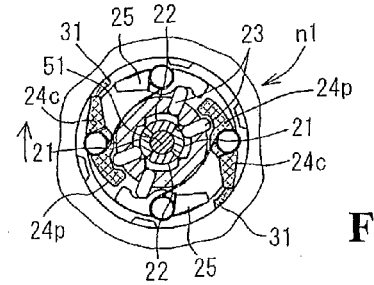

In addition, the 1st driven transmission gear n1, the leftward movement of the first cam rods 21 causes the pin members 23 enter the cam grooves 21v of the first cam rods 21, so that the swing claw members 24 are swung by the urging forces of the torsion coil springs 27 and the centrifugal forces of their engaging claw parts 24c, so as to project the engaging claw parts 24c outwards (see FIG. 23(c)).

Then, when the swing claw members 24 are rotated together with the counter gear shaft 12 to catch up with and abut on the engaging projected parts 31 in the 1st driven transmission gear n1, there is a moment that the engaging projected parts 31 in the 2nd driven transmission gear n2 and the engaging projected parts 31 in the 1st driven transmission gear n1 are simultaneously abutted on the engaging projected parts 24c, 25c of the respective swing claw members 24, 25, as shown in FIGS. 23(b) and 23(c).

Immediately upon this moment and then on, the engagement with the 1st driven transmission gear n1 rotated at a lower speed becomes effective, whereas the engagement with the 2nd driven transmission gear n2 is released, whereby the downshift from the 2nd to the 1st gear speed is performed.

While the movement of the control rod operating clement 70 ends at this point, the gear shift work goes further on. With the engagement of the engaging projected parts 31 in the 2nd driven transmission gear n2 with the swing claw members 24 released, the frictional resistance fixing the swing claw members 24 is eliminated. As a result, the second cam rods 22 having been urged by the spring 53s of the lost motion mechanism 53 is moved leftwards, and the pin members 23 having been engaged with the cam groove 22v come out of the cam grooves 22v to swing the swing claw member 24, thereby retreating the engaging claw parts 24c inwards (see FIG. 24(b). Besides, in the 1st driven transmission gear n1, the pin members 23 enter the cam grooves 22v, and the swing claw members 25 are swung by the urging forces of the torsion coil springs 27 and the centrifugal forces of their engaging claw parts 25c, to project the engaging claw parts 25c outwards (see FIG. 24(c)).

In this condition, the gear shift work from the 1st to the 2nd gear speed is completed.

Thus, in the process of the downshift from the 2nd gear speed condition to the 1 st gear speed condition (which is one step higher in reduction gear ratio than the 2nd gear speed condition, in the condition where the engaging claw parts 24c of the swing claw members 24 are in abutment on and in engagement with the engaging projected claw parts 31 in the 2nd driven transmission gear n2, the engaging claw parts 24c of the swing claw members 24 catch up with and abut on the engaging projected parts 31 in the 1st driven transmission gear n1 rotating at a lower speed, whereby the engagement is changed over. Therefore, the engagement of the engaging projected parts 31 in the 2nd driven transmission gear n2 with the engaging claw parts 24c of the swing claw members 24 is released smoothly. Accordingly, no force is needed to release the engagement, smooth operations are ensured, and a smooth downshift can be achieved.

A downshift from the 5th to the 4th gear speed, a downshift from the 4th to the 3rd gear speed, and a downshift from the 3rd to the 2nd gear speed can also be performed smoothly. Specifically, in these downshifts, in the condition where one driven transmission gear (n) is in engagement with the swing claw members 24, another driven transmission gear (n) which is one step higher in reduction gear ratio than the one driven transmission gear (n) is engaged with the swing claw members 24, to make the downshift. Therefore, no force is needed to release the engagement, smooth operations are ensured, and there is not need for a clutch for gear shift. In addition, there is utterly no loss in changeover time at the time of making a downshift, a loss of the driving force is avoided, the shift shock is small, and a smooth downshift can be achieved.

For example, in the 2nd gear speed condition, as shown in FIG. 22(b), the swing claw members 24 are in engagement with the engaging projected parts 31 in the 2nd driven transmission gear n2, and, simultaneously, the engaging claw parts 25c of the swing claw members 25 on the other hand are in an engageable state in proximity to the engaging projected parts 31.

Therefore, when due to vehicle acceleration a driving force is applied from the internal combustion engine to the 2nd driven transmission gear n2 and the direction of the driving force is changed, the engagement of the engaging projected parts 31 in the 2nd driven transmission gear n2 is speedily switched from the engagement with the swing claw members 24 to the engagement with the swing claw members 25, whereby the engagement can be smoothly handed over and maintained.

Besides, in the case of the downshift from the 2nd to the 1st gear speed, the engaging claw parts 25c of the swing claw members 25 in the 2nd driven transmission gear n2 are retreated inwards from the engageable state before the swing claw members 24 are engaged in the engaging projected parts 31 in the 1st driven transmission gear n1; therefore, these swing claw members 25 would not obstruct the gear shift (see FIG. 23(b)), and smooth and assured engagement and disengagement are performed.

In the condition where the pin members 23 have been fitted in the pin holes 12h formed in the circumferential grooves 12cv of the counter gear shaft 12, the swing claw members 24, 25 and the pivot pins 26 have been embedded in the recessed parts such as the recessed parts 12d, the circumferential grooves 12cv, the axial grooves 12av, etc. formed in the outer periphery of the counter gear shaft 12, the pin members 23 have been pressed from the outside by the swing claw members 24, 25, the bearing collar members 13 have been externally fitted over, and the pivot pins 26 have been fixed so that their state can be easily maintained, it is possible to mount the driven transmission gears (n) onto the bearing collar members 13 in the state of being rotatably borne. Therefore, a simple structure is ensured, the mounting (assembling) work can be carried out easily, and a shorter working time can be contrived.

Since the pivot pins 26 corresponding respectively to the driven transmission gears (n) are embedded in the axial grooves 12av in the counter gear shaft 12 in the state of being arrayed in rows along the axial direction, the axial grooves 12av in the counter gear shaft 12 are each simplified into a rectilinear shape, which permits easy machining thereof.

Since each of the bearing collar members 13 is disposed so as to bridgingly cover the adjacent ones 26, 26 of the pivot pins 26 arranged in rows, it is possible to reduce the number of the bearing collar members 13 to be used, to thereby use the bearing collar members 13 efficiently, to reduce the number of component parts, and to simplify the structure.

Since the driven transmission gears (n) are provided at both their inner peripheral edge parts with notches for slidable engagement with the bearing collar members 13, the bearing collar members 13 can bear the axial forces concerning the driven transmission gears (n), and can therefore ensure positioning of the driven transmission gears (n) in the axial direction and receive thrust forces therefrom.

Since the swing claw members 24, 25 are provided with the bearing recessed parts 24d, 25d by eliminating outside parts of the bearing holes in which to pass the pivot pins 26, the pivot pins 26 can be externally mounted into the bearing recessed parts 24d, 25d in the swing claw members 24, 25 so as to rotatably support the swing claw members 24, 25. Accordingly, it is possible to facilitate the mounting of the swing claw members 24, 25 to the counter 12, and to simplify the structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A multi-gear-speed transmission comprising:
a plurality of drive gears fixed to a first gear shaft; and
a plurality of driven gears fixed to a second gear shaft which is parallel to the first gear shaft, the drive gears and the driven gears normally being in a meshed state based on a gear speed,
an engaging means provided between the plurality of drive gears and the plurality of driven gears so as to make engagement therebetween, and
said engaging means being changed over by a gear shift driving means so as to make a gear shift, wherein said engaging means includes:
an engaging projected part projectingly formed at an inner peripheral surface of each said driven gears at a required location in the circumferential direction in a state of having engaging surfaces in the circumferential direction;
a cam rod which is put in sliding contact with an inner peripheral surface of an inner cavity of said second gear shaft so as to be movable in an axial direction, the cam rod having a sliding contact surface that is provided with a plurality of cam grooves at required locations in the axial direction;
pin members which are inserted in pin holes bored in required portions of said second gear shaft in a radial direction, and which are capable of being advanced or retreated, while alternately making contact with said sliding contact surface of said cam rod moved in the axial direction and with said cam groove; and
engaging claw members which are rotatably borne on pivot pins provided in said second gear shaft and which are capable of swinging by the advancing/retreating of said pin members so as to be engaged with or disengaged from said engaging projected parts,
said swing claw members and said pivot pins are embedded in recessed parts formed in an outer periphery of said second gear shaft,
annular bearing collar members externally fitted over said second gear shaft are so arranged as to press said pivot pins from an outer side, and wherein said driven gears are rotatably borne on said bearing collar members.

2. The multi-gear-speed transmission as set forth in claim 1, wherein
the pivot pins corresponding respectively to said driven gears are embedded in said recessed parts in said second gear shaft in a state of being arrayed in rows along the axial direction, and
said bearing collar members are arranged so as to bridgingly cover the adjacent pivot pins.

3. The multi-gear-speed transmission as set forth in claim 2, wherein notches are provided at both inner peripheral edge parts of said driven gears, the notches being provided for slidable engagement with said bearing collar members.

4. The multi-gear-speed transmission as set forth in claim 1, wherein each of said swing claw members is provided with a bearing recessed part to receive a corresponding one of said pivot pins.

5. The multi-gear-speed transmission as set forth in claim 2, wherein each of said swing claw members is provided with a bearing recessed part to receive a corresponding one of said pivot pins.

6. The multi-gear-speed transmission as set forth in claim 3, wherein each of said swing claw members is provided with a bearing recessed part to receive a corresponding one of said pivot pins.

7. The multi-gear-speed transmission as set forth in claim 1, wherein each of the driven gears is provided with left and right notches at left and right inner peripheral edge parts of the inner peripheral surface thereof, so that an annular projected rib is formed between the left and right notches, and the bearing collar members on left and right sides of each of the driven gears are slidably engaged with the notches clamp the projected rib therebetween.

8. The multi-gear-speed transmission as set forth in claim 7, wherein the engaging projected parts are provided at six locations at regular intervals along a circumferential direction of the projected rib.

9. The multi-gear-speed transmission as set forth in claim 1, wherein four of said swing claw members are arranged in a ring pattern around an axis of the driven shaft.

10. The multi-gear-speed transmission as set forth in claim 1, wherein intervals between the locations of the plurality of cam grooves are not all the same.

11. A multi-gear-speed transmission comprising:
a plurality of drive gears fixed to a main gear shaft; and
a plurality of driven gears fixed to a counter gear shaft which is parallel to the first gear shaft, the drive gears and the driven gears normally being in a meshed state based on a gear speed,
an engaging means provided between the plurality of drive gears and the plurality of driven gears so as to make engagement therebetween, and
said engaging means being changed over by a gear shift driving means so as to make a gear shift,
wherein said engaging means includes:
an engaging projected part projectingly formed at an inner peripheral surface of each said driven gears at a required location in the circumferential direction in a state of having engaging surfaces in the circumferential direction;
a cam rod which is put in sliding contact with an inner peripheral surface of an inner cavity of said second gear shaft so as to be movable in an axial direction, the cam rod having a sliding contact surface that is provided with a plurality of cam grooves at required locations in the axial direction;
pin members which are inserted in pin holes bored in required portions of said counter gear shaft in a radial direction, and which are capable of being advanced or retreated, while alternately making contact with said sliding contact surface of said cam rod moved in the axial direction and with said cam groove; and
engaging claw members which are rotatably borne on pivot pins provided in said counter gear shaft and which are capable of swinging by the advancing/retreating of said pin members so as to be engaged with or disengaged from said engaging projected parts,
said swing claw members and said pivot pins are embedded in recessed parts formed in an outer periphery of said counter gear shaft,
annular bearing collar members externally fitted over said counter gear shaft are so arranged as to press said pivot pins from an outer side, and wherein said driven gears are rotatably borne on said bearing collar members.

12. The multi-gear-speed transmission as set forth in claim 11, wherein
the pivot pins corresponding respectively to said driven gears are embedded in said recessed parts in said counter gear shaft in a state of being arrayed in rows along the axial direction, and
said bearing collar members are arranged so as to bridgingly cover the adjacent pivot pins.

13. The multi-gear-speed transmission as set forth in claim 12, wherein notches are provided at both inner peripheral edge parts of said driven gears, the notches being provided for slidable engagement with said bearing collar members.

14. The multi-gear-speed transmission as set forth in claim 11, wherein each of said swing claw members is provided with an arc-shaped bearing recessed part to receive a corresponding one of said pivot pins.

15. The multi-gear-speed transmission as set forth in claim 12, wherein each of said swing claw members is provided with a bearing recessed part to receive a corresponding one of said pivot pins.

16. The multi-gear-speed transmission as set forth in claim 13, wherein each of said swing claw members is provided with a bearing recessed part to receive a corresponding one of said pivot pins.

17. The multi-gear-speed transmission as set forth in claim 11, wherein each of the driven gears is provided with left and right notches at left and right inner peripheral edge parts of the inner peripheral surface thereof, so that an annular projected rib is formed between the left and right notches, and the bearing collar members on left and right sides of each of the driven gears are slidably engaged with the notches in the manner of clamping the projected rib therebetween.

18. The multi-gear-speed transmission as set forth in claim 17, wherein the engaging projected parts are provided at six locations at regular intervals along a circumferential direction of the projected rib.

19. A multi-gear-speed transmission comprising:
a plurality of drive gears fixed to a main gear shaft; and
a plurality of driven gears fixed to a counter gear shaft which is parallel to the first gear shaft, the drive gears and the driven gears normally being in a meshed state based on a gear speed,
an engaging means provided between the plurality of drive gears and the plurality of driven gears so as to make engagement therebetween, and
said engaging means being changed over by a gear shift driving means so as to make a gear shift,
wherein said engaging means includes:
an engaging projected part projectingly formed at an inner peripheral surface of each said driven gears at a required location in the circumferential direction in a state of having engaging surfaces in the circumferential direction;
a cam rod with an arc-shaped cross-section which is put in sliding contact with an inner peripheral surface of an inner cavity of said second gear shaft so as to be movable in an axial direction, the cam rod having a sliding contact surface that is provided with a plurality of cam grooves on a convex side thereof at required locations in the axial direction;
pin members which are inserted in pin holes bored in required portions of said counter gear shaft in a radial direction, and which are capable of being advanced or retreated, while alternately making contact with said sliding contact surface of said cam rod moved in the axial direction and with said cam groove; and
engaging claw members which are rotatably borne on pivot pins provided in said second gear shaft and which are capable of swinging by the advancing/retreating of said pin members so as to be engaged with or disengaged from said engaging projected parts,
said swing claw members and said pivot pins are embedded in recessed parts formed in an outer periphery of said counter gear shaft,
annular bearing collar members externally fitted over said counter gear shaft are so arranged as to press said pivot pins from an outer side, and wherein said driven gears are rotatably borne on said bearing collar members.

20. The multi-gear-speed transmission as set forth in claim 19, wherein the cam rod includes four cam rods arranged at regular intervals around the counter shaft.

\* \* \* \* \*